United States Patent
Dickman et al.

(10) Patent No.: US 6,890,672 B2
(45) Date of Patent: May 10, 2005

(54) FUEL PROCESSOR FEEDSTOCK DELIVERY SYSTEM

(75) Inventors: Anthony J. Dickman, Bend, OR (US); David J. Edlund, Bend, OR (US); William A. Pledger, Sisters, OR (US)

(73) Assignee: IdaTech, LLC, Bend, OR (US)

( * ) Notice: Subject to any disclaimer, the term of this patent is extended or adjusted under 35 U.S.C. 154(b) by 653 days.

(21) Appl. No.: 09/893,357

(22) Filed: Jun. 26, 2001

(65) Prior Publication Data

US 2003/0008186 A1 Jan. 9, 2003

(51) Int. Cl.⁷ .......................... H01M 8/04; H01M 8/06; B01J 8/00
(52) U.S. Cl. .......................... 429/19; 429/17; 422/189; 48/127.9
(58) Field of Search ................ 429/24–26, 17, 429/19; 422/189, 198, 105, 200, 202, 208; 48/127.9

(56) References Cited

U.S. PATENT DOCUMENTS

| | | |
|---|---|---|
| 3,338,681 A | 8/1967 | Kordesch |
| 3,469,944 A | 9/1969 | Bocard et al. |
| 3,920,416 A | 11/1975 | Houseman |
| 3,955,941 A | 5/1976 | Houseman et al. |
| 3,982,910 A | 9/1976 | Houseman et al. |
| 4,003,343 A | 1/1977 | Lee |
| 4,098,959 A | 7/1978 | Fanciullo |
| 4,098,960 A | 7/1978 | Gagnon |
| 4,127,393 A | 11/1978 | Timmins et al. |
| 4,134,739 A | 1/1979 | Gulden et al. |
| 4,238,403 A | 12/1980 | Pinto |
| 4,302,177 A | 11/1981 | Fankhanel et al. |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,444,158 A | 4/1984 | Yoon |
| 4,466,253 A | 8/1984 | Jaster |
| 4,473,622 A | 9/1984 | Chludzinski et al. |
| 4,533,607 A | 8/1985 | Sederquist |
| 4,567,857 A | 2/1986 | Houseman et al. |
| 4,642,273 A | 2/1987 | Sasaki |
| 4,657,828 A | 4/1987 | Tajima |
| 4,659,634 A | 4/1987 | Struthers |
| 4,666,457 A * | 5/1987 | Hayes et al. .................. 44/281 |
| 4,670,359 A | 6/1987 | Beshty et al. |
| 4,788,004 A | 11/1988 | Pinto et al. |
| 4,838,897 A | 6/1989 | Amano et al. |
| 4,880,040 A | 11/1989 | Pierson et al. |
| 5,344,721 A | 9/1994 | Sonai et al. |
| 5,458,857 A | 10/1995 | Collins et al. |

(Continued)

FOREIGN PATENT DOCUMENTS

| | | |
|---|---|---|
| EP | 1065741 A2 | 1/2001 |
| WO | WO 99/65097 | 12/1999 |

*Primary Examiner*—Tracy Dove
(74) *Attorney, Agent, or Firm*—Kolisch Hartwell, P.C.

(57) ABSTRACT

A feedstock mixing apparatus for fuel processing systems, and fuel processing and fuel cell systems incorporating the same. A fuel processing system according to the present invention includes one or more fuel processors adapted to produce a product hydrogen stream from a feed stream containing water and a carbon-containing feedstock. The fuel processing system further includes a feedstock delivery system adapted to mix the components of the feed stream at a determined mix ratio and to deliver this feed stream to the fuel processor(s). The fuel processing system may also include one or more fuel cell stacks that are adapted to produce an electric current from the product hydrogen stream produced by the fuel processing system. When the fuel processing system includes at least one fuel cell stack, it may be referred to as a fuel cell system.

85 Claims, 6 Drawing Sheets

U.S. PATENT DOCUMENTS

| | | |
|---|---|---|
| 5,616,430 A | 4/1997 | Aoyama |
| 5,637,414 A | 6/1997 | Inoue et al. |
| 5,639,431 A | 6/1997 | Shirasaki et al. |
| 5,658,681 A | 8/1997 | Sato et al. |
| 5,677,073 A | 10/1997 | Kawatsu |
| 5,714,276 A | 2/1998 | Okamoto |
| 5,780,179 A | 7/1998 | Okamoto |
| 5,798,186 A | 8/1998 | Fletcher et al. |
| 5,833,723 A | 11/1998 | Kuwabara et al. |
| 5,861,137 A | 1/1999 | Edlund |
| 5,997,594 A | 12/1999 | Edlund et al. |
| 6,042,956 A | 3/2000 | Lenel |
| 6,045,772 A | 4/2000 | Szydlowski et al. |
| 6,045,933 A | 4/2000 | Okamoto |
| 6,103,411 A | 8/2000 | Matsubayashi et al. |
| 6,165,633 A | 12/2000 | Negishi |
| 6,171,574 B1 | 1/2001 | Juda et al. |
| 6,190,623 B1 | 2/2001 | Sanger et al. |
| 6,221,117 B1 | 4/2001 | Edlund et al. |
| 6,375,906 B1 | 4/2002 | Edlund et al. |
| 2002/0119353 A1 * | 8/2002 | Edlund et al. ................ 429/19 |

* cited by examiner

FUEL PROCESSOR FEEDSTOCK DELIVERY SYSTEM

FIELD OF THE INVENTION

The present invention relates generally to fuel processing systems, which contain a fuel processor adapted to produce hydrogen gas, to fuel cell systems, which include a fuel processor and a fuel cell stack, and more particularly, to an improved method and system for supplying a mixed feedstock to a fuel processor.

BACKGROUND OF THE INVENTION

Fuel processing systems include a fuel processor that produces hydrogen gas or hydrogen-rich gas from common fuels such as a carbon-containing feedstock. Fuel cell systems include a fuel processor and a fuel cell stack adapted to produce an electric current from the hydrogen gas. The hydrogen or hydrogen-rich gas produced by the fuel processor is fed to the anode region of the fuel cell stack, air is fed to the cathode region of the fuel cell stack, and an electric current is generated.

In some fuel processors, the feedstock to the fuel processor includes only a single component. Examples of these fuel processors include electrolysis units, in which the sole feedstock is water, and pyrollysis and partial oxidation reactors, in which the sole feedstock is a hydrocarbon or alcohol. In many fuel processors, however, the feedstock includes more than one component, such as water and a carbon-containing feedstock. Examples of carbon-containing feedstocks include an alcohol and a hydrocarbon. When the feedstock includes more than one component, these components need to be mixed and delivered to the fuel processor. Because the feedstock does not include a single component, the two or more components forming the feedstock will be present in various percentages or fractions, with the relative mix of these percentages affecting the operation and/or efficiency of the fuel processor and the makeup of the product streams.

SUMMARY OF THE INVENTION

The present invention is directed to a feedstock mixing apparatus for fuel processing systems, and fuel processing and fuel cell systems incorporating the same. A fuel processing system according to the present invention includes one or more fuel processors adapted to produce a product hydrogen stream from a feed stream containing water and a carbon-containing feedstock. The fuel processing system further includes a feedstock delivery system that is adapted to mix the components of the feed stream at a determined mix ratio and to deliver this feed stream to the fuel processor(s). The fuel processing system may also include one or more fuel cell stacks that are adapted to produce an electric current from the product hydrogen stream produced by the fuel processing system. When the fuel processing system includes at least one fuel cell stack, it may be referred to as a fuel cell system.

DETAILED DESCRIPTION AND BEST MODE OF THE INVENTION

Figure 1:
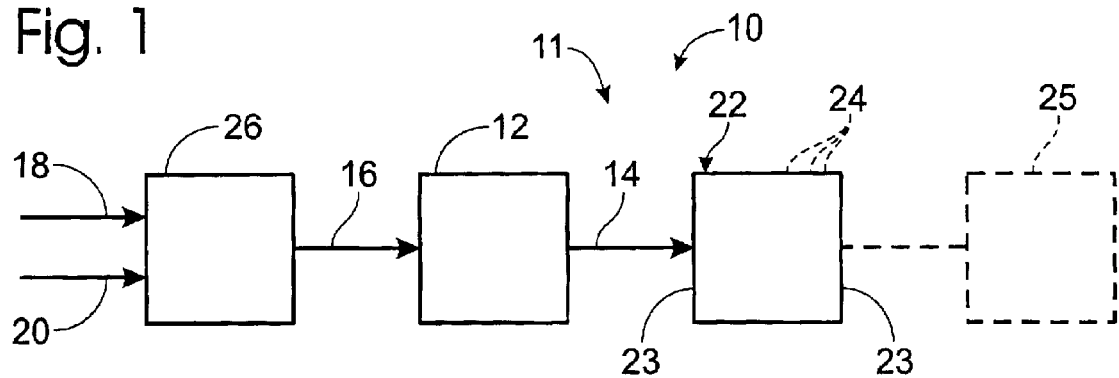
FIG. 1 is a schematic diagram of a fuel cell system with a feedstock delivery system according to the present invention.

A fuel cell system according to the present invention is shown in FIG. 1 and generally indicated at 10. System 10 includes at least one fuel processor 12, at least one fuel cell stack 22 and a feedstock delivery system 26. In FIG. 1, a fuel processing system is also shown and generally indicated at 11. Fuel processing system 11 contains feedstock delivery system 26 and at least one fuel processor 12 that is adapted to produce a product hydrogen stream 14 from a feed stream 16 delivered thereto by feedstock delivery system 26. As used herein, it should be understood that the term "fuel processing system" is used to refer to a system adapted to produce hydrogen gas from a feed stream, and "fuel cell system" is used to refer to a fuel processing system in combination with at least one fuel cell stack that is adapted to receive at least a portion of the product hydrogen stream from the fuel processing system and to produce an electric current therefrom.

Feedstock delivery system 26 is adapted to receive two or more streams 18 and 20 containing components to be delivered to fuel processor 12 as a feed stream 16, and to deliver these components in a predetermined ratio to the fuel processor. Fuel processor 12 is adapted to produce a product hydrogen stream 14 containing hydrogen gas from feed stream 16. The fuel cell stack 22 is adapted to produce an electric current from the portion of product hydrogen stream 14 delivered thereto. In the illustrated embodiment, a single fuel processor 12 and a single fuel cell stack 22 are shown, however, it should be understood that more than one of either or both of these components may be used and are within the scope of the present invention. It should also be understood that these components have been schematically illustrated and that the fuel cell system may include additional components that are not specifically illustrated in the figures, such as feed pumps, air delivery systems, heating assemblies, heat exchangers, and the like.

Fuel processor 12 includes any suitable device that is adapted to produce hydrogen gas from feed stream 16. Preferably, the fuel processor is adapted to produce substantially pure hydrogen gas, and even more preferably, the fuel processor is adapted to produce pure hydrogen gas. For the purposes of the present invention, substantially pure hydrogen gas is greater than 90% pure, preferably greater than 95% pure, more preferably greater than 99% pure, and even more preferably greater than 99.5% pure. Suitable fuel processors are disclosed in U.S. Pat. Nos. 5,997,594, 5,861,137, and 6,221,117, and pending U.S. patent application Ser. No. 09/802,361, which was filed on Mar. 8, 2001, and is entitled "Fuel Processor and Systems and Devices Containing the Same," the complete disclosures of each of which are incorporated by reference in their entireties for all purposes.

Figure 2:
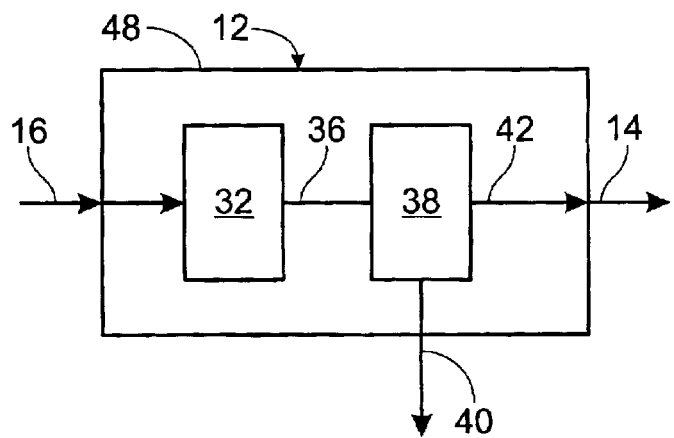
FIG. 2 is a schematic diagram of a fuel processor suitable for use in the fuel cell system of FIG. 1.

An illustrative example of a fuel processor 12 is schematically illustrated in FIG. 2. As shown, fuel processor 12 includes a hydrogen-producing region 32 in which a stream 36 containing hydrogen gas is produced from feed stream 16, such as using one of the above-described mechanisms. Stream 36 may contain pure hydrogen gas, substantially pure hydrogen gas, or a mixed gas stream containing hydrogen gas and other gases. In embodiments of fuel processor 12 in which stream 36 is not of sufficient purity for the intended use of the produced hydrogen gas, stream 36 may be delivered to a purification region 38, in which at least a portion of the other gases are removed from stream 36 to produce a purified hydrogen stream 42, and in some embodiments, a byproduct stream 40. In embodiments of fuel processor 12 that do not contain a purification region, stream 36 forms product hydrogen stream 14 as it exits the fuel processor. In embodiments having a purification region, the purified hydrogen stream 42 forms product hydrogen stream 14. It should be understood that fuel processor 12 may include additional filtration or purification regions, such as those involving chemical and/or mechanical separation of the other gases and/or impurities from the stream forming product hydrogen stream 14.

In the illustrative embodiment shown in FIG. 2, the above-described regions are housed in a common shell 48. However, it is within the scope of the present invention that the fuel processor may be formed without a shell, that the regions may be housed in more than one shell, and that at least one of the regions may partially or completely extend beyond, or be located external to, shell 48.

Figure 3:
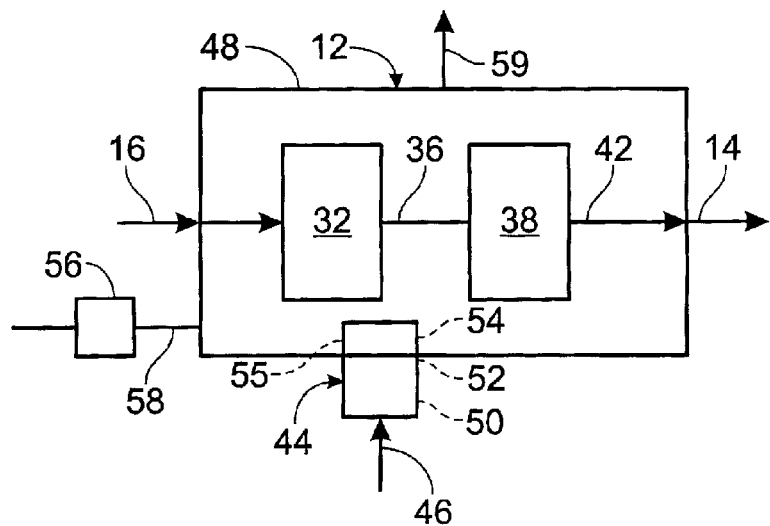
FIG. 3 is a schematic diagram of another fuel processor suitable for use in the fuel cell system of FIG. 1.

In many embodiments, fuel processor 12 will operate at elevated temperatures, such as a range between 200° C. and 700° C. Accordingly, fuel processor 12 may include a heating assembly 44, such as shown in FIG. 3. Heating assembly 44 may take any suitable form adapted to heat fuel processor 12, or selected components thereof, to a sufficient operating temperature. Heating assembly 44 may be included within shell 48, or may be located external shell 48 and adapted to deliver heated fluid streams thereto. In FIG. 3, assembly 44 is schematically illustrated partially internal and external shell 48 to represent that the heating assembly may be completely within the shell, completely external the shell, or partially within the shell.

Typically, heating assembly 44 will receive a fuel stream 46, such as shown in FIG. 3. Examples of suitable heating assemblies include electric heaters 50, such as electric resistance heaters, that receive a fuel stream 46 of electrical power and produce heat therefrom to heat the fuel processor. The electrical power may come from an external source, from fuel cell stack 22, from previously stored power from stack 22, or combinations thereof.

Another example of a suitable heating assembly 44 is a combustion device 52 that contains an ignition source 54 and which combusts a fuel stream 46 containing a combustible fuel to produce heat therefrom to heat the fuel processor. Examples of suitable combustion devices 52 include burners and combustion catalyst beds, which typically are used in conjunction with a combustion chamber or region 55 in which the combustible fuel is mixed with air. Examples of suitable ignition sources 54 include a spark plug, glow plug, combustion catalyst, pilot light, and combinations thereof. Examples of suitable fuel streams 46 for a heating assembly that includes a combustion device include one or more of byproduct stream 40, vented or exhaust gases from fuel processor 12 or fuel cell stack 22, and a fuel stream from an external or self-contained source of a combustible fuel, such as propane, gasoline, kerosene, diesel, natural gas, etc. Additional examples include slipstreams from product hydrogen stream 14, mixed gas stream 36 and/or feed stream 16.

Also shown in FIG. 3 is an air delivery assembly 56, which is adapted to deliver an air stream 58 to fuel processor 12, such as to combustion region 55 from which a combustion exhaust stream 59 exits. Air delivery assembly 56 is schematically illustrated in FIG. 3 and may take any suitable form. It should be understood that fuel processor 12 and/or heating assembly 44 may be formed without an air delivery assembly 56, such as depending upon the particular mechanism by which the heating assembly operates.

As discussed with reference to FIG. 1, fuel cell systems 10 according to the present invention include one or more fuel cell stacks 22 that are adapted to receive product hydrogen stream 14 from fuel processing system 11, and more specifically from fuel processor 12. Fuel cell stack 22 may receive all of product hydrogen stream 14. Alternatively, some or all of stream 14 may be delivered, via a suitable conduit, for use in another hydrogen-consuming process, burned for fuel or heat, or stored for later use.

As schematically illustrated in FIG. 1, fuel cell stack 22 contains at least one, and typically multiple, fuel cells 24 that are joined together between common end plates 23, which contain fluid delivery/removal conduits (not shown). Examples of suitable fuel cells include proton exchange membrane (PEM) fuel cells and alkaline fuel cells. Each fuel cell 24 is adapted to produce an electric current from the portion of the product hydrogen stream 14 delivered thereto. This electric current may be used to satisfy the energy demands, or applied load, of an associated energy-consuming device 25. Illustrative examples of devices 25 include, but should not be limited to, a motor vehicle, recreational vehicle, boat, tools, lights or lighting assemblies, appliances (such as household or other appliances), household, signaling or communication equipment, etc. It should be understood that device 25 is schematically illustrated in FIG. 1 and is meant to represent one or more devices or collection of devices that are adapted to draw electric current from the fuel cell system. By "associated," it is meant that device 25 is adapted to receive electrical power generated by stack 22. It is within the scope of the invention that this power may be stored, modulated or otherwise treated prior to delivery to device 25. Similarly, device 25 may be integrated with stack 22, or simply configured to draw electric current produced by stack 22, such as via electrical power transmission lines.

Figure 4:
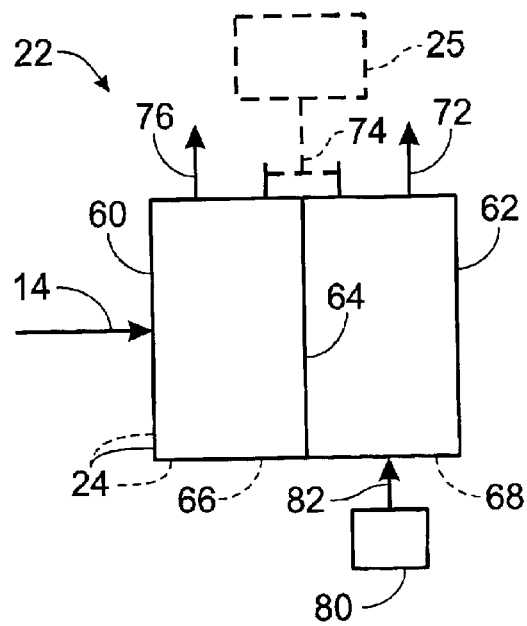
FIG. 4 is a schematic diagram of a fuel cell stack suitable for use in the fuel cell system of FIG. 1.

In FIG. 4, an illustrative example of a fuel cell stack is shown. Stack 22 (and the individual fuel cells 24 contained therein) includes an anode region 60 and a cathode region 62, which are separated by an electrolytic membrane or barrier 64 through which hydrogen ions may pass. The anode and cathode regions respectively include anode and cathode electrodes 66 and 68. Anode region 60 of the fuel cell stack receives hydrogen stream 14. Cathode region 62 of the fuel cell stack 22 receives an air stream 70, and releases a cathode air exhaust stream 72 that is partially or substantially depleted in oxygen. Electrons liberated from the hydrogen gas cannot pass through barrier 64, and instead must pass through an external circuit 74, thereby producing an electric current that may be used to meet the electrical load applied by the one or more devices 25, as well as to power the operation of the fuel cell system.

Anode region 60 is periodically purged, and releases a purge stream 76, which may contain hydrogen gas. Alternatively, hydrogen gas may be continuously vented from the anode region of the fuel cell stack and re-circulated. An electric current is produced by fuel cell stack 22 to satisfy an applied load, such as from device 25. Also shown in FIG. 3 is an air delivery assembly 78, which is adapted to deliver an air stream 82 to fuel cell stack 22, such as to cathode region 62. Air delivery assembly 78 is schematically illustrated in FIG. 3 and may take any suitable form. It is within the scope of the present invention that air delivery assemblies 56 and 78 may be a single device, or separate devices.

Figure 5:
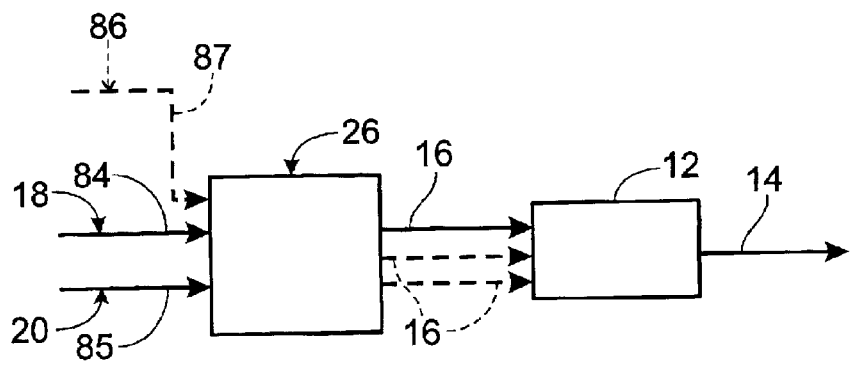
FIG. 5 is a schematic diagram of a feedstock delivery system according to the present invention.

As discussed, feedstock delivery system 26 is adapted to receive streams containing the components of feed stream 16 and to form feed stream 16 from predetermined ratios of these components. As shown in FIG. 5, system 26 is adapted to receive streams 18 and 20, which respectively contain a first feedstock component 84, and a second feedstock component 85. System 26 is further adapted to deliver components 84 and 85 in a predetermined mix ratio to fuel processor 12 via feed stream 16. Feed stream 16 and the streams delivering the feedstock components to system 26 may be transported by any suitable mechanism, such as by a pump assembly containing at least one pump or by gravity. Similarly, any subsequently described intermediate streams may also be transported by these or any other suitable mechanism.

It will be understood that while FIG. 5 shows only two streams 18 and 20 being delivered to system 26, feedstock delivery system 26 may be adapted to receive more than two streams containing feedstock components and to deliver a predetermined mix ratio of those components to the fuel processor 12. To illustrate this point, a third stream is shown in dashed lines in FIG. 5 at 86 and contains a third feedstock component 87. It is within the scope of the present invention that more than three streams and/or components may be used.

Feedstock components 84 and 85 (and 87) typically will contain one or more substantially, if not completely, different compositions. For example, one of streams 18 and 20 may contain a carbon-containing feedstock, and the other may contain water. As a further example, one of streams 18 and 20 may contain a mixture of two or more carbon-containing feedstocks, and the other of streams 18 and 20 may contain water. As still a further example, one of streams 18, 20 and 86 may contain water and the other two may contain carbon-containing feedstocks. In yet another example, one or more of streams 18, 20 (and/or 86) may include a corresponding component 84, 85 (or 87) that is a mixture of two or more compositions.

Figure 6:
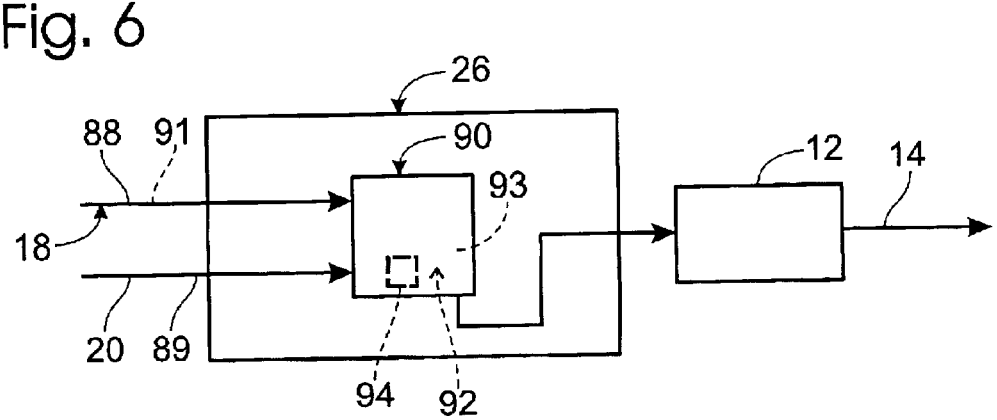
FIG. 6 is a schematic diagram of another feedstock delivery system according to the present invention.

It should be understood that the above examples are meant to illustrate just a few of the possible components 84, 85 and 87 that may be used with the feedstock delivery system of the present invention, and that these examples are not intended to be an exhaustive list of all possible combinations and examples. In the following discussion, system 26 will be described in the context of receiving two streams, namely streams 18 and 20, with stream 18 containing a component 84 in the form of a carbon-containing feedstock 88, and stream 20 containing a component 85 in the form of water 89, such as shown in FIG. 6.

Examples of suitable carbon-containing feedstocks 88 include at least one hydrocarbon or alcohol. Examples of suitable hydrocarbons include methane, propane, natural gas, diesel, kerosene, gasoline and the like. Examples of suitable alcohols include methanol, ethanol, propanol, and polyols, such as ethylene glycol and propylene glycol.

A single feed stream 16 is shown in FIG. 5, however, it is within the scope of the invention that system 26 may deliver two or more feed streams 16 to fuel processor 12 and that the feed streams may have the same or different components. To illustrate this point, a pair of feed streams 16 are shown in dashed lines in FIG. 5. When the carbon-containing feedstock is miscible, or soluble, with water, the feedstock components are typically delivered as a single feed stream 16, such as shown in FIG. 5, or as two or more feed streams having the same or essentially the same compositions, such as shown in dashed lines in FIG. 5. When the carbon-containing feedstock is immiscible or only slightly miscible with water, these components are typically delivered to fuel processor 12 in separate streams from separate reservoirs or supplies. In this case, feedstock delivery system 26 may deliver a desired relative amount of the components delivered to system 26 separately to fuel processor 12. A benefit of a single feed stream 16 or a plurality of feed streams 16 having the same components is that the relative proportions, or mix ratio, of the components will not vary depending upon the rate at which the stream or streams are delivered to the fuel processor, or the operation of the pump or other mechanism or mechanisms used to deliver the feed stream or streams, etc. For example, if feed stream 16 is drawn from a reservoir containing a homogenous mixture of the feedstock components, such as components 84 and 85, then the predetermined mix ratio is maintained regardless of the rate at which the fluid is drawn from the reservoir and/or the number of feed streams 16 that are drawn from the reservoir.

An additional example of a feed stream 16 that is within the scope of the present invention and which may be delivered to fuel processor 12 in a single stream is an emulsion formed from water and one or more carbon-containing feedstocks 88 that are not miscible with water. In such an embodiment, the feedstock delivery system will typically also receive a surfactant 91, either as a separate stream, such as stream 86, or premixed with carbon-containing feedstock 88 or water 89. In FIG. 6, surfactant 91 is indicated in dashed lines to show the latter delivery mechanism. Any suitable surfactant or mixture of surfactants may be used. A feedstock delivery system adapted to produce and deliver a feed stream 16 containing an emulsion will typically include an emulsion-producing device 94, such as a mechanical agitator. It is within the scope of the invention that the term "emulsion-producing device" is meant to include any suitable powered or non-powered device that causes the water and carbon-containing feedstock components to interact and form an emulsion therefrom. It should similarly be understood that in embodiments of system 26 in which the feedstock components are miscible, surfactant 91 and device 94 are not required.

Similar to a carbon-containing feedstock that is miscible with water, an emulsion of a carbon-containing feedstock and water also produces a generally homogenous mixture of the feedstock components, thereby producing a stream, or plurality of streams, that will have the same or essentially the same composition regardless of when and from what location the stream is drawn from the feedstock delivery system. In the emulsion- or miscible-embodiments of the feedstock delivery system described herein, the delivery system may be described as being adapted to draw and deliver to a fuel processor one or more feed streams 16 from a reservoir containing a generally uniform or homogenous mixture of the feedstock components, with the drawn streams having the same or essentially the same composition as the liquid in the mixture in the reservoir.

An example of a feedstock delivery system according to the present invention that is adapted to receive feedstock components that are miscible, or soluble, with each other is shown in FIG. 6. In the illustrated embodiment, the feedstock delivery system 26 includes a reservoir 90 that is adapted to receive streams containing the feedstock components, such as streams 18 and 20. In the context of a reformer, such as a steam or autothermal reformer, in which one of the components is water, then the carbon-containing feedstock should be water-soluble. Nonexclusive examples of water-soluble carbon-containing feedstocks include methanol, ethanol, propanol, ethylene glycol and propylene glycol. Alternatively, the carbon-containing feedstock should form an emulsion with water, such as in the presence of a surfactant 91 and/or agitator or other emulsion-producing device 94.

Figure 7:
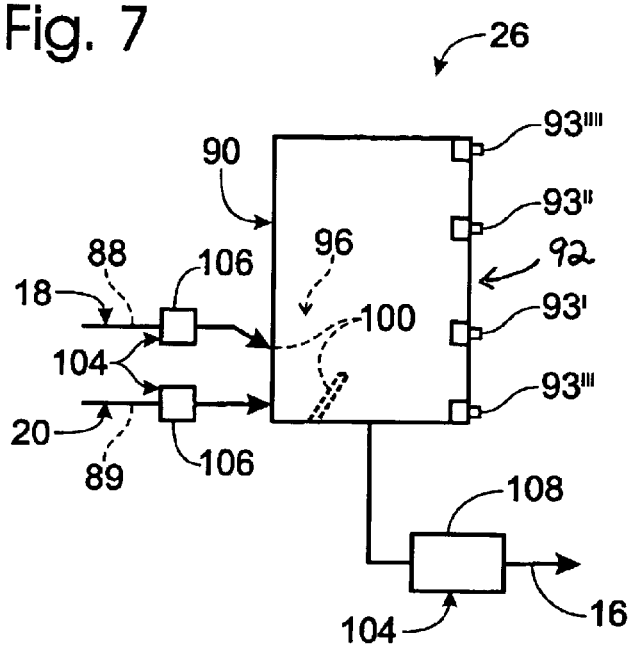
FIG. 7 is a schematic diagram of another feedstock delivery system according to the present invention.
Figure 8:
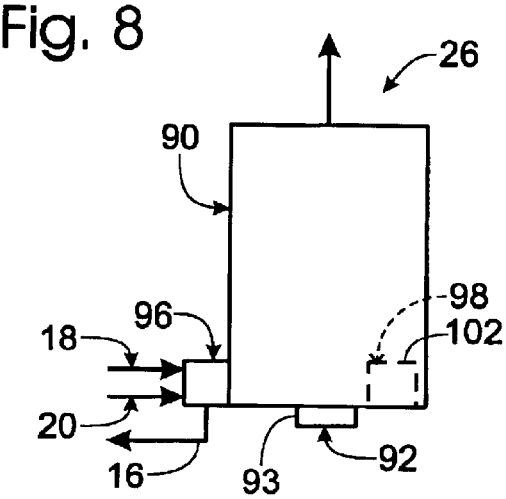
FIG. 8 is a schematic diagram of another feedstock delivery system according to the present invention.

The feedstock delivery system further includes a sensor assembly 92 associated with the reservoir. By "associated," it is meant that the sensor assembly is adapted to detect one or more predetermined triggering events related to, or indicative of, the quantity of one or more of the feedstock components in the reservoir. Sensor assembly 92 includes at least one sensor 93, and in some embodiments will include a plurality of sensors. It is within the scope of the invention that the sensor assembly may be partially within reservoir 90, completely within reservoir 90, or completely external to reservoir 90. Regardless of the position of sensor assembly 92 relative to reservoir 90, the sensor assembly is adapted to measure the amount of one or more feedstock components in reservoir 90 and detect the one or more triggering events related thereto. To provide an example of illustrative configurations for sensor assembly 92, FIG. 6 schematically depicts sensor assembly 92 internal reservoir 90, FIG. 7 schematically depicts sensor assembly 92 partially within and partially external reservoir 90, and FIG. 8 schematically depicts sensor assembly 92 external reservoir 90. It should be understood that these illustrative configurations are meant to provide graphical examples of suitable configurations within the scope of the invention and that feedstock delivery systems according to the present invention may have any of these configurations, or others.

A "triggering event" according to the present invention is a measurable event in which a predetermined threshold value or range of values representative of a predetermined amount of one or more of the components forming feed stream 16 is reached or exceeded, thereby indicating that a preselected quantity of the one or more components are present in the reservoir. As used herein, "exceeded" is meant to include deviation from the threshold value or range of values in either direction, such as depending upon the particular threshold event being measured. For example, a threshold event corresponding to the reservoir containing the predetermined maximum volume of fluid would be exceeded when more than this volume is added to the reservoir. On the other hand, a triggering event corresponding to the predetermined minimum fluid-level in the reservoir is exceeded when the fluid level drops below this level.

Examples of triggering events include the mass, volume and/or flow of one or more of the components or of the total mass and/or volume of the components within reservoir 90. Other triggering events are related to the physical properties of the total liquid, or mixed feedstock components, in the reservoir, such as the refractive index, thermal conductivity, density, viscosity, optical absorbance, and electrical conductivity of the liquid in the reservoir.

The number and type of sensors 93 in a particular sensor assembly are at least partially determined by the type of triggering event to be detected. For example, if the triggering event is a predetermined volume of liquid inside the reservoir, the sensor assembly may include any suitable device adapted to measure the volume of liquid inside the reservoir. An example of a suitable sensor 93 includes a level detector or switch, such as a float, optical level detector, and the like. If the triggering event is a selected mass of liquid inside the reservoir, the sensor assembly may include at least one sensor 93 in the form of a suitable gravimetric measurement device, such as a pressure transducer or a mass transducer. If the triggering event is a selected physical property of the liquid in reservoir 90, suitable sensors include one or more devices adapted to measure that physical property, such as a refractive index sensor, thermal conductivity sensor, densitometer (density sensor), viscometer (viscosity sensor), spectrophotometer (optical absorbance sensor), or electrical conductivity sensor. These sensors may also be used as volumetric sensors by placing the sensor at the desired volumetric level within reservoir 90. Otherwise, the physical property sensors will typically be located at a level beneath the maximum predetermined volume level in the reservoir.

It should be understood that sensor assembly 92 may include a single sensor or more than one sensor, and may include at least one redundant sensor, i.e., partial or total redundancy of sensors. For example, assembly 92 may include at least one sensor associated with the triggering event(s) of each component, at least one sensor associated with the triggering event(s) of the first component delivered to the reservoir, and/or at least one sensor associated with the triggering event(s) of the total amount of liquid in the reservoir.

Responsive to the detection of a triggering event, feedstock delivery system 26 is adapted to regulate the flow of the feedstock components into and/or out of reservoir 90 to obtain a predetermined ratio of the components in feed stream 16. Typically, the ratio will be a predetermined molar ratio between the components because it is the molar ratio of carbon to oxygen atoms in feed stream 16 that affects the efficiency of fuel processor 12. However, because the desired, or predetermined, molar ratio and the compositions forming feed stream 16 are predetermined, the mix ratio of the components may be expressed in other terms, such as by the relative mass or volume of the components to each other and/or to the total volume of the components in the reservoir or reservoirs.

For example, in the embodiment of feedstock delivery system 26 shown in FIG. 6, in which feedstock components 88 and 89 (and in some embodiments 91) are mixed in a common reservoir 90, the components will typically be delivered to the reservoir sequentially, and especially when a gravimetric or volumetric sensor is used. Accordingly, a first stream 18 is delivered to reservoir 90 until a corresponding triggering event corresponding to the desired amount of a first feedstock component, such as carbon-containing feedstock 88 (or other component 84), is detected by sensor assembly 92. Upon detection of the triggering event, delivery of stream 18 is halted and delivery of a second feedstock component, such as water (or other component 85), from stream 20, is commenced. The second feedstock component is delivered to reservoir 90 until such time as the sensor assembly 92 detects a second triggering event corresponding to the predetermined amount of the second component. Upon detection of a second triggering event, delivery of the second feedstock component is halted. This cycle may be repeated until all desired feedstock components have been delivered to reservoir 90, at which time the feedstock mix within the reservoir may be delivered to fuel processor 12 as one or more feed stream(s) 16. It should be understood that the order in which the components are delivered does not matter, so long as the feedstock delivery system is configured to receive the components in the selected order. Because the feed streams are delivered from reservoir 90 and because the feedstock components are miscible with each other or formed into an emulsion, the predetermined mix ratio will be maintained regardless of the rate or position at which the feed stream or streams are drawn from the reservoir.

When system 26 includes a mechanical agitator or other emulsion-producing device, the feedstock components may be constantly agitated as the components are being added to reservoir 90, agitated after the first or second feedstock components are introduced into the reservoir, or agitated after all of the feedstock components have been added in their desired amounts. For purposes of brevity, the following discussion will refer to a mixture of a carbon-containing feedstock, such as methanol, that is miscible with water. In the following discussion, it should be understood that a carbon-containing feedstock that is not miscible with water, such as a hydrocarbon, but forms an emulsion therewith, such as with a surfactant and/or mechanical agitation, may be used as well.

An example of a sensor assembly 92 adapted to measure triggering events corresponding to volumetric measurements is shown in FIG. 7. As shown, reservoir 90 includes a sensor assembly 92 having a plurality of sensors 93 that are adapted to detect triggering events corresponding to the volume of fluid in the reservoir. Sensor assembly 92 includes a first sensor 93' adapted to detect when the predetermined volume of a first feedstock component is present in the reservoir, and a second sensor 93" to detect when a predetermined volume of a second feedstock component is present in the reservoir, namely when the total volume of the components in the reservoir reaches a predetermined volume. As discussed, the order of delivery of the feedstock components may vary, so long as the sensors are positioned to receive the feed components in the selected order. After the desired amounts of the feedstock components are present in the reservoir, the mixed components may be delivered to a holding tank, or may be delivered to fuel processor 12. Prior to the delivery of the mixed components to the holding tank or fuel processor, the components may be further mixed or agitated to promote the homogeneity of the mixture forming feed stream 16.

Sensor assembly 92 may further include a third sensor 93''' adapted to detect when the reservoir contains less than a predetermined minimum volume of liquid, thereby indicating that the filling process should be repeated. The minimum fluid level may correspond to when the reservoir is empty. However, because the volumes of sensors 93', 93" and 93''' are predetermined relative to each other, the order in which the feedstock components will be added and the predetermined mix ratio, the minimum volume may correspond to some predetermined amount of fluid in the reservoir.

Sensor assembly 92 may, but does not necessarily, include another sensor 93"" that is adapted to detect when the reservoir contains more than a predetermined maximum volume of liquid. Sensor 93"" indicates a volume greater than the total predetermined volume of the feedstock components, and as such provides a safety mechanism. More specifically, sensor 93"" only detects a triggering event if the reservoir is nearing or at a volume that exceeds the capacity of the reservoir. Actuation of sensor 93"" may cause one or more of the following: immediate stoppage of feedstock components from being introduced to reservoir 90, immediate stoppage of feed streams 16 from being delivered to fuel processor 12, shut down or idling of fuel processor 12, isolation of fuel cell stack 22, and actuation of a user-alert device, such as an alarm, siren, light-emitting device, output on a monitor, etc.

An example of a feedstock delivery system 26 with a sensor assembly 92 adapted to measure triggering events corresponding to gravimetric (pressure and/or mass) measurements of the amount of the feedstock components present in reservoir 90 is shown in FIG. 8. As shown, reservoir 90 includes a sensor assembly 92 having a sensor 93 that is adapted to detect triggering events corresponding to the mass or pressure of fluid in the reservoir. Similar to the embodiment discussed in FIG. 6, a first feedstock component is delivered until the sensor assembly detects a triggering event corresponding to a predetermined amount of the component, and then a second component is delivered until a corresponding second triggering event is detected. In further similarity to the above volumetric-embodiment, the order in which the feedstock components is delivered may vary, so long as sensor assembly 92 is configured to receive the feedstock components in the selected order.

The triggering events for a gravimetric system are determined by the desired mass or pressure of liquid in the reservoir, such as the mass or pressure corresponding to a predetermined amount of the first feedstock component, the mass or pressure corresponding to the combined first and second components, etc. When reservoir 90 has a uniform cross-sectional area, the mass of liquid in the reservoir is equal to the density of the liquid times the cross-sectional area of the reservoir times the height of the liquid in the reservoir. The pressure of a liquid measured at the bottom of the reservoir is equal to the density of the liquid times the acceleration of gravity (g) times the height of the liquid in the reservoir. Furthermore, the mass and pressure of a liquid in the reservoir are proportional, in that the mass is equal to the pressure times a proportionality constant, namely, the cross-sectional area of the reservoir divided by the acceleration of gravity.

In a gravimetric system, the reservoir does not need to be completely emptied between fillings, or cycles, so long as the sensor assembly, or controller associated with the sensor assembly, is zeroed between cycles. Alternatively, the mass of feedstock components added to the reservoir may be determined by the difference from an initial, or starting, value obtained prior to delivery of any or a particular feedstock components. It is within the scope of the invention that the sensor assembly, or controller associated with the controller assembly, may or may not be zeroed between cycles or between the introduction of feedstock components. Because any remaining liquid in reservoir 90 after a particular cycle contains a homogenous or generally homogenous mixture of the feedstock components, each fraction of the mixture, including any residual amount in the reservoir, should have the same or approximately the same compositions. Therefore, if the predetermined amounts of the feedstock components are added to the reservoir in addition to any remaining amount of the components, the predetermined mix ratio will be maintained, subject to the sensor assembly being zeroed, or reset, between fillings and the capacity of the reservoir to contain the predetermined amounts being added in addition to any residual from the prior cycle. This also applies to a volumetric system, except that the sensors of a volumetric system would need to either be repositioned to account to the residual volume of liquid in the reservoir or be present in sufficient redundancy to have sensors propositioned for more than one possible sequential order in which the feedstream components are delivered to the reservoir.

Advantages of the gravimetric method include the method's insensitivity to temperature and the ease of accurately sensing pressure or weight. Another advantage of the gravimetric method when preparing feedstock for a fuel processor is that the ratio of feed stream components can be changed while the fuel processor is operating. For example, a controller can be programmed to change the gravimetric set points for the carbon-containing feedstock and water (e.g., to increase or decrease the ratio of carbon-containing feedstock to water). This change may be in response to an external factor, such as an increase in pressure drop through the reforming catalyst bed of the fuel processor that indicates carbon deposition on the catalyst, or it may be programmed to occur at preset intervals as preventative maintenance. Passing a feed stream 16 containing water without carbon-containing feedstock, or a high ratio of water to carbon-containing feedstock through the hot reforming catalyst bed may be used to remove carbon from reforming catalysts. Furthermore, additional feedstock components may be added to the reservoir without making changes to the sensor assembly or reservoir.

The controller may also be programmed to supply a high ratio of water to carbon-containing feedstock to the fuel processor when it is first operated following a replacement of the catalyst. This water-rich feedstock mixture allows the activity of the reforming catalyst to be increased, with the additional water making it less likely that the reforming catalyst will be overheated. The controller may be programmed for these functions or receive an appropriate user input to deliver this feed ratio.

FIG. 7 also provides an example of a feedstock delivery system 26 in which the streams containing the feedstock components and the one or more feed streams 16 are each delivered to or removed from the reservoir through separate inputs and outputs. It is within the scope of the invention, however, that the system may include a manifold 96 through which streams 18 and 20 (and any other streams delivering feedstock components) deliver the components to the reservoir, and through which one or more feed streams 16 are removed from the reservoir. An example of such an embodiment is shown in FIG. 8 for purposes of illustration. Also shown in FIG. 7 are various flow-regulating devices 104, which are shown to illustrate that feedstock delivery systems according to the present invention will typically include flow-regulating devices 104 in the form of valve assemblies 106 to regulate the flow into and/or out of the tanks and reservoirs described and illustrated herein. Similarly, a flow-regulating device 104 in the form of a pump 108 is also schematically illustrated to demonstrate that pumps may be used to transport the feed streams and feedstock component described herein. It should be understood that these flow-regulating devices have been schematically illustrated to demonstrate examples of suitable devices and placements for the devices, and that all of the feedstock delivery systems described herein will incorporate some suitable form of flow-regulating devices. Preferably, some or all of the devices communicate with the sensor assemblies so that detection of a triggering event causes a predetermined response in at least one corresponding flow-regulating device. Examples of typical responses include causing one or more of the valve assemblies to open or close, and causing a pump to start or stop pumping fluid. The communication between the sensor assemblies and the flow-regulating devices may be via any suitable mechanical and/or electrical communication.

As discussed, feedstock delivery system 26 is adapted to receive two or more streams containing feedstock components, optionally mix these streams together to form a homogenous or generally uniform mixture of the components, and then deliver at least one feed stream 16 to a fuel processor 12 containing a predetermined mix ratio of the feedstock components. While the predetermined mix ratio may be measured based on the volumetric amount of the components to be delivered, the gravimetric amount of the components to be delivered, or the physical properties of the mixture of the components to be delivered, these amounts generally are based upon a preselected molar ratio of carbon and oxygen in feed stream 16. For example, consider a fuel processor in the form of a steam or autothermal reformer in which a carbon-containing feedstock is reacted with water in the presence of a reforming catalyst to produce hydrogen gas and various byproducts. If the carbon-containing feedstock is methanol, the ideal reaction stoichiometry is as follows:

$$CH_3OH+H_2O=CO_2+3H_2$$

As shown, one mole of water is required for each mole of methanol. Similarly, one mole of water is required for each mole of carbon. Volumetrically, approximately 31–33% water may be mixed with approximately 67–69% methanol to achieve this mix ratio. This range avoids a mix that is deficient in water, namely, a mix that contains less than the ideal stoichiometric amount of water shown in the above equation. For example, 4.5 liters of water may be mixed with 10 liters of methanol. Gravimetrically, 18 grams of water may be mixed with 32 grams of methanol to achieve this stoichiometric mix ratio (i.e. 64 wt % methanol).

In comparison, the reaction follows the following ideal stoichiometry if the carbon-containing feedstock is ethanol:

$$CH_3CH_2OH+3H_2O=2CO_2+6H_2$$

As shown, three moles of water are required for each mole of ethanol. In terms of carbon atoms, 1.5 moles of water are required for each mole of carbon, or overall, 2 moles of oxygen atoms are required for each mole of carbon. Volumetrically, 54 mL of water may be mixed with 58.3 mL of ethanol at room temperature to produce this stoichiometric mix ratio. Gravimetrically, 54 grams of water may be mixed with 46 grams of ethanol to produce this stoichiometric mix ratio. Of course, these relative volumetric and gravimetric measurements are provided as illustrated examples and may be scaled up or down proportionally depending upon such factors as the volume of reservoir 90, the desired total volume to be produced, and/or the rate at which the feed stream is delivered to the fuel processor.

As a further example, consider an emulsion formed from hexane and water, which reacts according to the following ideal stoichiometry in a reformer:

$$C_6H_{14}+12H_2O=6CO_2+19H_2$$

In terms of carbon atoms, 2 moles of water are required for each mole of carbon, or overall, expressed in terms of carbon and oxygen atoms, 2 moles of oxygen atoms are required for each mole of carbon.

It is within the scope of the present invention that mix ratios other than a stoichiometric mix ratio may be used, including mix ratios that are greater and lower than the stoichiometric mix ratios described above. For a reformer, such as a steam or autothermal reformer, the mix ratio is preferably at or above the stoichiometric mix ratio. When less than the stoichiometric mix ratio is used, meaning that there is less water than the stoichiometric amount of water required per mole of carbon, the feed stream may be referred to as being "water lean." Such a feed stream will tend to produce carbon deposits, or coke, which may block the reaction sites on the reforming catalyst and thereby increasing the pressure drop through the reforming region and/or otherwise decrease the efficiency of the hydrogen-producing region, which typically includes one or more reforming catalyst beds. To guard against coke reformation, the feed stream may be "water rich," which means that the feed stream contains more than the stoichiometric ratio of water to carbon. In fact, it may be periodically desirable to use a feed stream 16 that contains an excess of water (more than 50% greater than the stoichiometric mix ratio) to remove accumulated coke. As used herein, an "excess water" mix ratio refers to a mix ratio that contains at least 50% more water than the stoichiometric mix ratio. It is within the scope of the present invention that an excess water mix ratio may be 100% extra water, or more. However, a tradeoff with the prevention and/or removal of coke resulting from using excess water is the increased energy required to vaporize this excess water, thereby increasing the energy requirements of the reformer. As used herein, the term "stoichiometric" and "stoichiometry" are used to refer to ideal reactions, although it should be understood that the actual reactions that occur may differ from the ideal stoichiometry.

In view of the above coke and energy considerations, a reformer typically will be operated with a mix ratio that ranges from the stoichiometric mix ratio to approximately 10–50% greater water on a molar basis than the stoichiometric mix ratio, and for many carbon-containing feedstocks at a molar mix ratio that ranges from 10–25% greater water than the stoichiometric mix ratio. For others, such as methanol in which coke formation is not as likely to occur, a mix ratio that ranges between the stoichiometric mix ratio and 10% greater water (on a molar basis), or preferably, 2–4% greater water (on a molar basis) may be used.

As a still further example of the embodiment described above, when a methanol-water feedstock is used, a desired molar ratio is often 1:1. This molar ratio is obtained by mixing predetermined masses or volumes of methanol or water. As an example, this predetermined ratio is obtained by mixing 10 liters of methanol and 4.5 liters of water. Continuing the above example, when adding methanol to the reservoir before water, the sensor assembly may be adapted to detect when the reservoir contains 10 liters of liquid and 14.5 liters of liquid. (Alternatively, when adding water before methanol, the sensor assembly could be adapted to detect when the reservoir contains 4.5 liters of liquid and 14.5 liters of liquid.) As will be understood, other appropriate volumes could be used to obtain the same molar ratio. Volumetrically speaking, a 1:1 molar ratio is approximately 69% methanol to 31% water.

Table 1, below, lists illustrative examples of desired stoichiometric and excess water ratios for mixing water-soluble carbon-containing feedstocks with water. It is within the scope of the invention, however, that ratios other than those presented in the table may be used. For example, in some embodiments, ratios between the listed stoichiometric and excess water ratios may be useful. It is also within the scope of the invention that ratios outside of these ratios may be used.

TABLE 1

Exemplary Mix Ratios for Water-Soluble Carbon-Containing Feedstocks and Water

| Carbon-Containing Feedstock | Stoichiometric Ratio (oxygen:carbon) | Excess Water Ratio (oxygen:carbon) |
|---|---|---|
| Methanol | 1:1 | 2–3:1 |
| Ethanol | 2:1 | 3:1 |
| Ethylene Glycol | 2:1 | 3:1 |
| Propylene Glycol | 2:1 | 3:1 |

For example, for feed streams containing ethanol and water, 58.4 mL of ethanol may be mixed with 54 mL of water to achieve the above-indicated stoichiometric ratio, and 58.4 mL of ethanol may be mixed with 90 mL of water to achieve the above-indicated excess water ratio. For feed streams containing ethylene glycol and water, 55.8 mL of ethylene glycol may be mixed with 36 mL water to achieve the above-indicated stoichiometric ratio and 55.8 mL of ethylene glycol may be mixed with 72 mL of water to achieve the above-indicated excess water ratio. For feed streams containing propylene glycol and water, 73.2 mL of propylene glycol may be mixed with 72 mL of water to achieve the above-indicated stoichiometric ratio and 73.2 mL of propylene glycol may be mixed with 126 mL of water to achieve the above-indicated excess water ratio. It should be understood that system 26 may be adapted to deliver feed streams containing oxygen:carbon ratios other than the 2:1 and 3:1 ratios described above, such as ratios between these values, above these values or below these values. Similarly, molar ratios may be selected that are based upon relationships other than moles of oxygen to carbon, such as moles of a particular carbon-containing feedstock to moles of water, or moles of a first component to a second component.

As discussed previously, feedstock delivery system 26 adapted to produce an emulsion from water and a carbon-containing feedstock that is not (or is only slightly) miscible with water will typically include a mechanical agitator or other emulsion-producing device 94. In embodiments of system 26 in which the feedstock components are miscible with each other, the reservoir may optionally include one or more mixing devices 98 that are adapted to promote mixing of the feedstocks, thereby generating increased homogeneity within the reservoir. Examples of suitable mixing devices 98 are static devices 100, such as baffles, helical fins, and the orientation at which the streams containing the feedstock components are directed into the reservoir. For example, orienting the streams tangential to the sidewalls of the reservoir will promote mixing within the reservoir. Other examples of mixing devices 98 are dynamic devices 102, such as devices that move responsive to the flow of the feedstock compositions striking the device, such as a vane or other movable baffle, and electrically powered devices that stir the liquid in the reservoir. A benefit of static devices is that they do not require power to operate and/or are less prone to failure because of their general absence of moving parts. Examples of mixing devices 98 are schematically illustrated in FIGS. 7 and 8. It should be understood that any of the feedstock delivery systems discussed herein may include a mixing device 98, and that the systems shown in FIGS. 7 and 8 may be formed without a mixing device.

Figure 9:
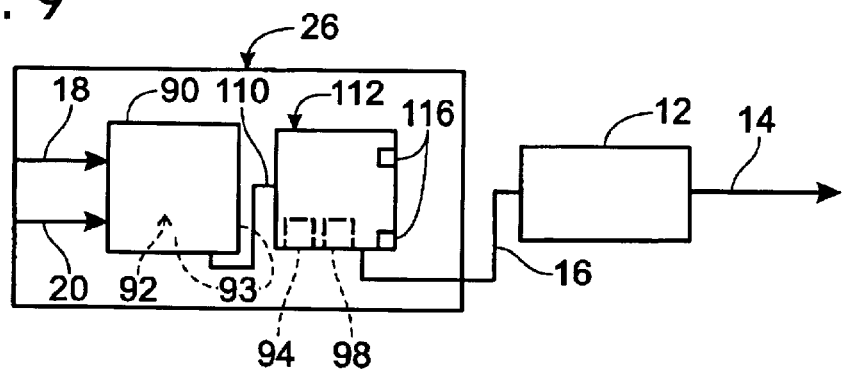
FIG. 9 is a schematic diagram of another feedstock delivery system according to the present invention.

From reservoir 90, one or more feed streams 16 may be delivered to fuel processor 12 to deliver the feedstock components thereto in the predetermined mix ratio, such as illustrated in FIGS. 6–8. It is also within the scope of the invention that the mixed feedstock components may be delivered to a holding tank prior to delivery to the reformer or other fuel processor. An example of such a feedstock delivery system is shown in FIG. 9. As shown, stream 110 fluidly connects reservoir 90 to a holding tank 112, which may be any vessel adapted to receive the mixed feedstock components and from which one or more feed streams 16 may be selectively drawn to deliver the components to fuel processor 12. Stream 110, and the other streams discussed herein, may be delivered via any suitable mechanism, such as by gravity flow, by pumping, etc. Typically, holding tank 112 will have at least as large of a capacity as reservoir 90. Tank 112 may also be referred to as a sequential reservoir, in which case the feedstock delivery system may be described as having at least two sequential reservoirs adapted to receive and mix the feedstock components prior to delivery of the feed stream in the predetermined mix ratio to fuel processor 12.

Transferring the mixed feedstock components to a holding tank prior to delivering the feed streams to fuel processor 12 provides an opportunity to increase the mixing of the feedstock components, such as while flowing from reservoir 90 to tank 112, as well as when being introduced into tank 112. For example, because the feedstock components are already present in the predetermined mix ratio as they are introduced into tank 112, any swirling or other agitation of the fluid promotes mixing, whereas no mixing occurs in reservoir 90 until two feedstock components are present in the reservoir.

In use, tank 112 enables a batch of mixed feedstock components at the predetermined mix ratio to be selectively dispensed to fuel processor 12 while another batch of feedstock components at a predetermined mix ratio is being prepared. This increases the ability of the fuel cell system or fuel processing system to be able to meet an applied demand, and especially to do so while maintaining the predetermined mix ratio.

Tank 112 preferably includes a sensor assembly 114 containing at least one sensor 116 adapted to detect one or more triggering events within the tank. Sensor assembly 114 and sensors 116 may have any suitable structure and location, such as those discussed above with respect to assembly 92 and sensors 93. An example of such a triggering event is when the amount of mixed feedstock components in the holding tank is less than a selected minimum amount. For example, a sensor 116', such as a gravimetric or volumetric sensor, may be used to detect this triggering event. Similarly, physical property sensors positioned to function as level sensors may also be used. Responsive to the detection of this event, the feedstock delivery system may deliver more mixed feedstock components from reservoir 90 and/or prepare another batch of premixed feedstock components. At least with respect to the above-described triggering event, a lesser degree of accuracy may be used because the responsiveness of the sensor assembly will not affect the mix ratio of the feedstock components. Similar to reservoir 90, tank 112 may include more than one sensor, such as a sensor 116" that is adapted to detect a triggering event corresponding to when the volume of liquid in the tank exceeds a predetermined maximum volume. Responsive to detection of this triggering event, system 26 may stop the flow of mixed feedstock components from reservoir 90, increase the flow rate of streams 16, and/or deliver at least a portion of the feedstock components in reservoir 90 or tank 112 to an auxiliary source, such as an additional holding tank, combustion source, disposal or the like. Tank 112 may, but does not necessarily, include an emulsion-producing device 94 and/or mixing device 98, such as schematically illustrated in dashed lines in FIG. 9.

In FIGS. 6–9, feedstock delivery system 26 is adapted to fill a single reservoir 90 with the feedstock components. It is within the scope of the invention that system 26 may include more than one reservoir, such as an embodiment of the system that includes a primary reservoir (such as reservoir 90) and a secondary or downstream reservoir (such as tank 112) into which the contents of the primary reservoir are emptied prior to delivery to fuel processor 12. It is also within the scope of the invention that the feedstock delivery system may include more than one primary reservoir and/or a primary reservoir that is partitioned into a plurality of regions.

Figure 10:
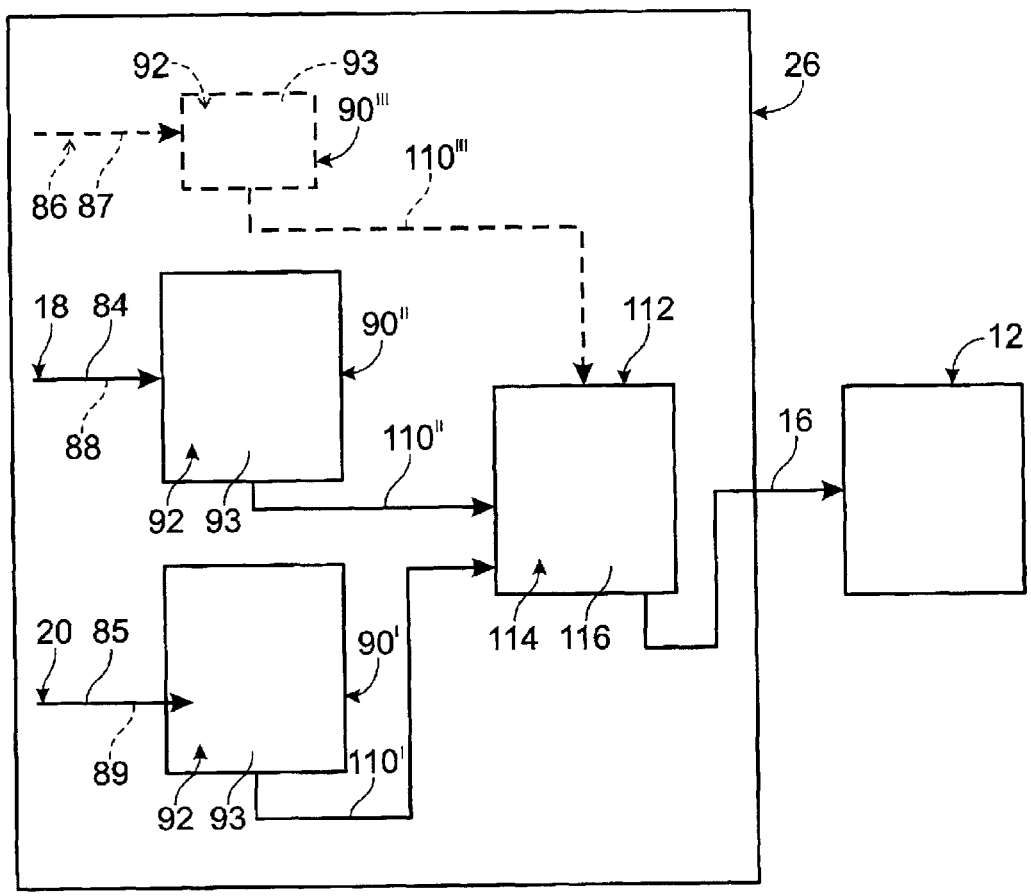
FIG. 10 is a schematic diagram of another feedstock delivery system according to the present invention.

For example, in FIG. 10, an embodiment of a feedstock delivery system is shown in which the streams containing the feedstock components are each delivered to a separate primary reservoir. For purposes of illustration the streams and compositions previously shown and discussed with respect to FIG. 5 are shown in FIG. 10. As discussed, however, stream 86 may be omitted and one of compositions 84 and 85 should include water 89 and the other should include a carbon-containing feedstock 88. In the illustrated embodiment, system 26 includes reservoirs 90', 90" and 90''', each of which is adapted to receive a predetermined amount of the corresponding feedstock component and to deliver a stream 110', 110" and 110''' containing that component to a secondary reservoir, or holding tank 112. As shown, each of the primary reservoirs includes a sensor assembly 92 with at least one sensor 93, and holding tank 112 includes sensor assembly 114 with at least one sensor 116.

As a variation of the embodiment shown in FIG. 10, the delivery system may be formed without tank 112, and feed stream 16 may be formed from discrete streams from each reservoir that are delivered as a unit to fuel processor 12. Such an embodiment is suitable for use in which the feedstock components are not miscible and are not formed into an emulsion. In such an embodiment, the streams are preferably, but not necessarily, delivered via a mechanism in which the relative flow rate of each stream is controlled to correspond to the relative flow rates of the other streams, thereby maintaining the predetermined mix ratio even though the streams contain different components that are not mixed until delivery to fuel processor 12. An example of such a mechanism is a dual- or multi-headed pump, such as disclosed in copending U.S. patent application Ser. No. 09/190,917, which was filed on Nov. 12, 1998, is entitled "Fuel Cell System," and the complete disclosure of which is hereby incorporated by reference for all purposes.

Figure 11:
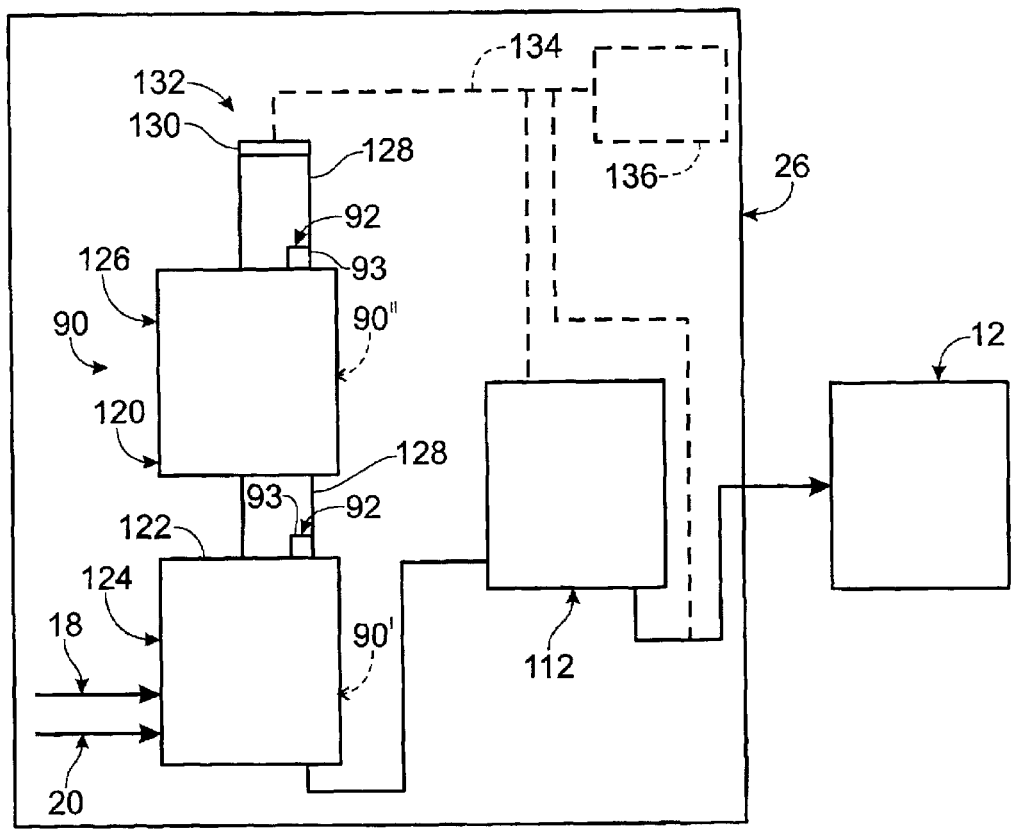
FIG. 11 is a schematic diagram of another feedstock delivery system according to the present invention.

In FIG. 11, an embodiment of a partitioned reservoir 90 is shown and generally indicated at 120. As shown, reservoir 120 includes a partition 122 that separates the reservoir into a pair of regions 124 and 126. Unless otherwise discussed, each of the reservoirs disclosed herein (and regions thereof) may include a sensor assembly 92 having one or more sensors 93 adapted to detect one or more selected triggering events. Preferably, at least region 124 is sized to correspond to the amount of the first feedstock component to be added to the reservoir. This selective sizing of the reservoir enables greater accuracy in a volumetric measurement because the volume of the first feedstock component may be measured at a conduit, or neck portion, 128 that interconnects the regions and which has a reduced cross-sectional area compared to regions 124 and 126. When sensor assembly 92 is adapted to detect triggering events corresponding to volumetric measurements, it may be desirable for both of the regions to be sized to correspond to the volume of fluid to be contained therein for the predetermined mix ratio and to include a conduit or neck portion 128 of reduced cross-sectional area in which the volumetric measurements are made. Reservoir 120 may alternatively be described as a pair of primary reservoirs that are fluidly connected so that liquid overflowing from the first reservoir (90') flows into the second reservoir (90").

For example, as stated above, the desired methanol-water molar ratio is often 1:1 and this ratio is obtainable by mixing 10 liters of methanol with 4.5 liters of water. Thus, when adding methanol before water, region 124 may have a 10-liter capacity and region 126 may have a 4.5-liter capacity. In this embodiment, the sensor assembly may include volumetric sensors 93, such as level indicators, positioned at the top of each region, indicating when each portion is filled. As will be appreciated, the regions may have capacities other than those discussed above, so long as the predetermined mix ratio is obtainable. For example, at least one of the regions may have a capacity that exceeds the desired volume of liquid to be received in the region. In such an embodiment, a sensor or sensor assembly associated with that region may be positioned to measure when the desired volume has been achieved.

In FIG. 11, reservoir 120 (and 90") is shown including a vent 130 through which excess fluid in the reservoir may be exhausted. Vent 130 may exhaust any feedstock components passing thereto to the environment, or deliver the components to a combustion source. However, vent 130 preferably forms a portion of a self-contained spill-prevention assembly 132. By "self-contained," it is meant that the spill-prevention assembly is adapted to deliver, via an overflow stream 136, any fluid passing therethough to a containment structure. For example, overflow stream 136 may deliver any fluid passing therethrough to a spill tank, such as a tank 134 that is configured solely to contain waste or vented feedstock components, to mix tank 112, or to fuel processor 12. A benefit of a dedicated disposal unit, such as spill tank 134 is that the vented feedstock components are not introduced into the fuel processor. However, and especially when system 26 is adapted to detect a triggering event in the form of a flow of feedstock components in vent stream 136, the amount of feedstock components in stream 136 should typically be fairly small and therefore should have only a negligible effect on the predetermined mix ratio.

Figure 12:
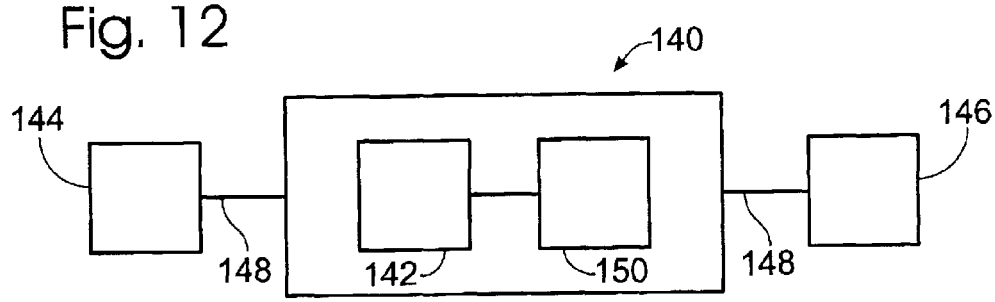
FIG. 12 is a schematic diagram of a suitable controller for use with the feedstock delivery systems of FIGS. 1 and 5–11.

Feedstock delivery systems 26 according to the present invention may, but do not necessarily, include a controller 140. Controller 140 is adapted to monitor selected operating parameters such as detection of the preselected triggering event(s) by the sensor assembly in the feedstock delivery system and/or the pressures, temperatures, and flow rates of the fuel cell or fuel processing system and direct the relative flow of the feedstock components and feed stream 16 to and from the feedstock delivery system 26 at least partially in response to monitored values. An example of a controller is schematically illustrated in FIG. 12. As shown, controller 140 includes a processor 142, which communicates with sensors 144 and controlled-devices 146 via communication linkages 148. Communication linkage 148 may be any suitable wired or wireless mechanism for one- or two-way communication between the corresponding devices, such as input signals, command signals, measured parameters, etc.

Illustrative examples of controlled devices 146 include the flow-regulating devices 104 discussed herein, such as valves and pumps. Other examples include compressors, heating assemblies, fuel processor 12, and fuel cell stack 22. Illustrative examples of sensors 144 include sensors 93 and/or 116. However, processor 142 may communicate with additional sensors 144, such as to monitor other operating conditions of the feedstock delivery system and/or other components of the fuel processing or fuel cell system. Similarly, the processor may communicate with various sensors adapted to measure the compositions of one or more streams to determine whether the measured composition corresponds to the expected composition. In addition to the sensors described above, other examples of suitable sensors include temperature sensors, ammeters, and sensors adapted to measure the composition of a particular stream.

Processor 142 may have any suitable form, such as including a computerized device, software executing on a computer, an embedded processor, programmable logic controllers or functionally equivalent devices. The controller may also include any suitable software, hardware, or firmware. For example, the controller may include a memory device 150 in which preselected, preprogrammed and/or user-selected operating parameters are stored. The memory device may include a volatile portion, nonvolatile portion, or both.

It should be understood that the particular form of communication between the processor, sensors and controlled elements may take any suitable configuration. For example, the sensors may constantly or periodically transmit measured values to the processor, which compares these measured values to stored threshold values or ranges of values to determine if the measured value exceeds a preprogrammed or stored value or range of values. If so, the processor may send a command signal to one or more of the controlled devices. In another example, the sensors themselves may measure an operating parameter and compare it to a stored or predetermined threshold value or range of values and send a signal to the processor only if the measured value exceeds the stored value or range of values. By "exceeds," it is meant that the measured value deviates from the preselected or stored value or range of values in either direction, and that this deviation may alternatively include a selected tolerance, such as a deviation by more than 5%, 10%, 25%, etc.

Examples of operating parameters measured by the sensors include the above-discussed triggering events. Preferably, the controller's memory device includes threshold values or ranges of values corresponding to more than one set of triggering events. For example, for a particular set of feedstock components, the controller may contain threshold values corresponding to the stoichiometric mix ratio, excess water mix ratio, and perhaps additional mix ratios between or beyond these ratios. Responsive to user inputs to the subsequently described user interface, or to measured parameters detected by the sensors, the controller may switch between these stored mix ratios and corresponding threshold values. Similarly, the controller may include one or more sets of threshold values or ranges of values for the set of feedstock components when the components are delivered to the feedstock delivery system in a different order. As another example, the controller may include one or more sets of threshold values or ranges of value corresponding to a different set of feedstock components. Each of these sets of threshold values may be stored in the controller's memory device.

Another example of an operating parameter to be measured by controller 140 is the time it takes for various amounts of the feedstock components and/or the intermediate or feed streams to travel into, within, or out of feedstock delivery system 26. More specifically, controller 140 may provide an additional safety check by measuring the time it takes for a predetermined amount of liquid to flow within the feedstock delivery system and comparing this time to a stored threshold value. The time may be measured, for example, from when a flow-regulating device 104 is actuated to begin the flow of the liquid, and when a triggering event corresponding to the predetermined amount of the liquid being present should be received. If this time is exceeded, or exceeded by more than a selected tolerance, then this time period itself becomes a triggering event indicative of a malfunction within the feedstock delivery system.

As discussed, the operation of system 26 may be controlled at least in part by the measured parameters detected by sensors 144. The processor compares the measured parameters to the stored threshold values, and if one or more measured parameters exceeds its corresponding threshold value or range of values, the processor sends a control signal to one or more controlled devices 146 within the feedstock delivery system, and/or within the complete fuel cell or fuel processing system.

Figure 13:
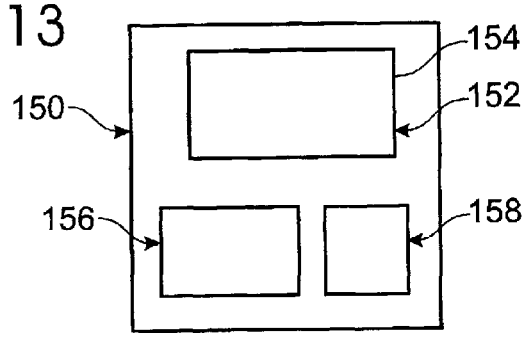
FIG. 13 is a schematic diagram of a user interface for use with the controller of FIG. 12.

Controller 140 may also include a user interface through which a user may monitor and/or interact with the operation of the controller. An example of a user interface is shown in FIG. 13 and indicated generally at 150. As shown, interface 150 includes a display region 152 with a screen 154 or other suitable display mechanism in which information is presented to the user. For example, display region 152 may display the current values measured by one or more of sensors 142, the current operating parameters of the system, the stored threshold values or ranges of values. Previously measured values may also be displayed. Other information regarding the operation and performance of the fuel processing system may also be displayed in region 152.

User interface 150 may also include a user input device 156 through which a user communicates with, such as by sending commands to, the controller. For example, input device 156 may enable a user to input commands to change the operating state of the fuel processing of the fuel cell system, to change the mix ratio to be used, the order in which the feedstock components are delivered to the feedstock delivery system, to change one or more of the stored threshold values and/or operating parameters of the system, and/or to request information from the controller about the previous or current operating parameters of the system. Input device 156 may include any suitable device for receiving user inputs, including rotary dials and switches, push-buttons, keypads, keyboards, a mouse, touch screens, etc. Also shown in FIG. 13 is a user-signaling device 158 that alerts a user when an acceptable threshold level has been exceeded. Device 158 may include an alarm, lights, or any other suitable mechanism or mechanisms for alerting users.

It should be understood that it is within the scope of the present invention that the feedstock delivery system may include a controller without a user interface, and that it is not required for the user interface to include all of the elements described herein. The elements described above have been schematically illustrated in FIG. 13 collectively, however, it is within the scope of the present invention that they may be implemented separately. For example, the user interface may include multiple display regions, each adapted to display one or more of the types of user information described above. Similarly, a single user input device may be used, and the input device may include a display that prompts the user to enter requested values or enables the user to toggle between input screens.

Figure 14:
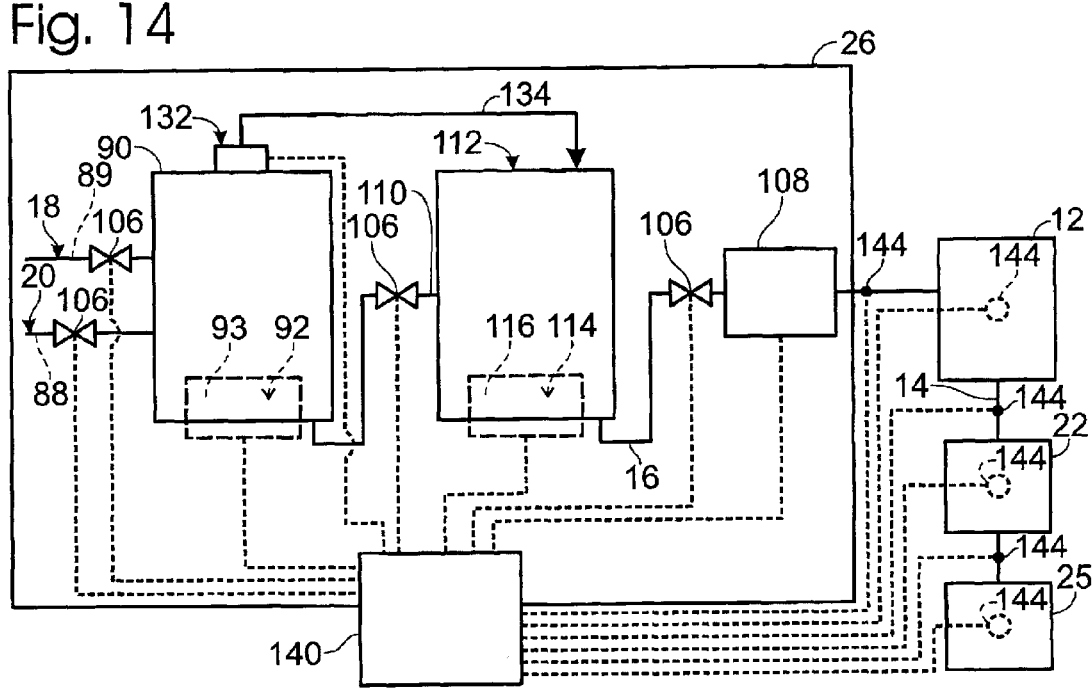
FIG. 14 is a schematic diagram of a fuel cell system including a feedstock delivery system with a controller according to the present invention.

In FIG. 14, controller 140 is shown being in communication with sensor assemblies 92 and 114. Controller 140 may also be in communication with various sensors 144 located throughout fuel processing system 11 and the fuel cell system 10. As will be understood, controller 140 may be located within, external to, or partially within and partially external to feed stock delivery system 26.

It should be understood that the flow-regulating devices shown in FIG. 14 may be, but are not necessarily, controlled devices within the scope of the present invention. For example, valves 106 are shown associated with control supply streams 18 and 20, intermediate stream 110 and feed stream 16. Controller 140 may communicate with and control valves 106, as well as sensor assemblies 92 and 114. In addition, controller 140 may control mix pump 108. System 10 may include less than all of these communication lines, and may also include many more lines of communication throughout the fuel cell system. Controller 140 may direct the mixing and delivery of the feedstock to the fuel processor system using the above-described system.

Figure 15:
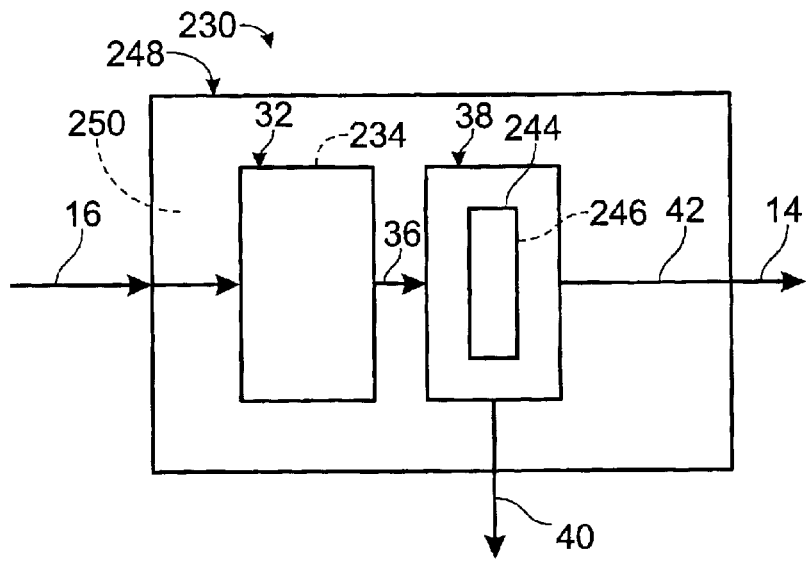
FIG. 15 is a schematic diagram of a suitable reformer for use with the feedstock delivery systems according to the present invention.

An example of a suitable fuel processor 12 suitable for use in systems 10 and 11 is a steam reformer. An example of a suitable steam reformer is shown in FIG. 15 and indicated generally at 230. Reformer 230 includes a hydrogen-producing region 32 that includes a steam reforming catalyst 234. In the context of a steam reformer, hydrogen-producing region 32 may be referred to as a reforming region. Alternatively, reformer 230 may be an autothermal reformer that includes an autothermal reforming catalyst. In reforming region 32, a mixed gas stream 36 containing hydrogen gas and other gases is produced from feed stream 16. In the context of a steam reformer, stream 36 may also be referred to as a reformate stream. Stream 36 is delivered to a separation region, or purification region, 38, where the hydrogen gas is purified. In separation region 38, the hydrogen-containing stream is separated into one or more byproduct streams, which are collectively illustrated at 40, and a hydrogen-rich stream 42 by any suitable pressure-driven separation process. In FIG. 15, hydrogen-rich stream 42 is shown forming product hydrogen stream 14.

An example of a suitable structure for use in separation region 38 is a membrane module 244, which contains one or more hydrogen-selective metal membranes 246. Examples of suitable membrane modules formed from a plurality of hydrogen-selective metal membranes are disclosed in U.S. patent application Ser. No. 09/291,447, which was filed on Apr. 13, 1999, is entitled "Fuel Processing System," and the complete disclosure of which is hereby incorporated by reference in its entirety for all purposes. In that application, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other suitable membranes and membrane modules are disclosed in U.S. patent application Ser. No. 09/618,866, which was filed on Jul. 19, 2000 and is entitled "Hydrogen-Permeable Metal Membrane and Method for Producing the Same," and U.S. patent application Ser. No. 09/812,499, which was filed on Mar. 19, 2001 and is entitled "Hydrogen-Selective Metal Membrane Modules and Method of Forming the Same," the complete disclosures of which are hereby incorporated by reference in their entireties for all purposes. Other suitable fuel processors are also disclosed in the incorporated patent applications.

The thin, planar, hydrogen-permeable membranes are preferably composed of palladium alloys, most especially palladium with 35 wt % to 45 wt % copper. These membranes, which also may be referred to as hydrogen-selective membranes, are typically formed from a thin foil that is approximately 0.001 inches thick. It is within the scope of the present invention, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents.

Another example of a suitable pressure-separation process for use in separation region 38 is pressure swing absorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 36. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent. Impurity gases such as $NH_3$, $H_2S$, and $H_2O$ adsorb very strongly on the adsorbent material and are therefore removed from stream 36 along with other impurities. If the adsorbent material is going to be regenerated and these impurities are present in stream 36, separation region 38 preferably includes a suitable device that is adapted to remove these impurities prior to delivery of stream 36 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å(5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

Figure 16:
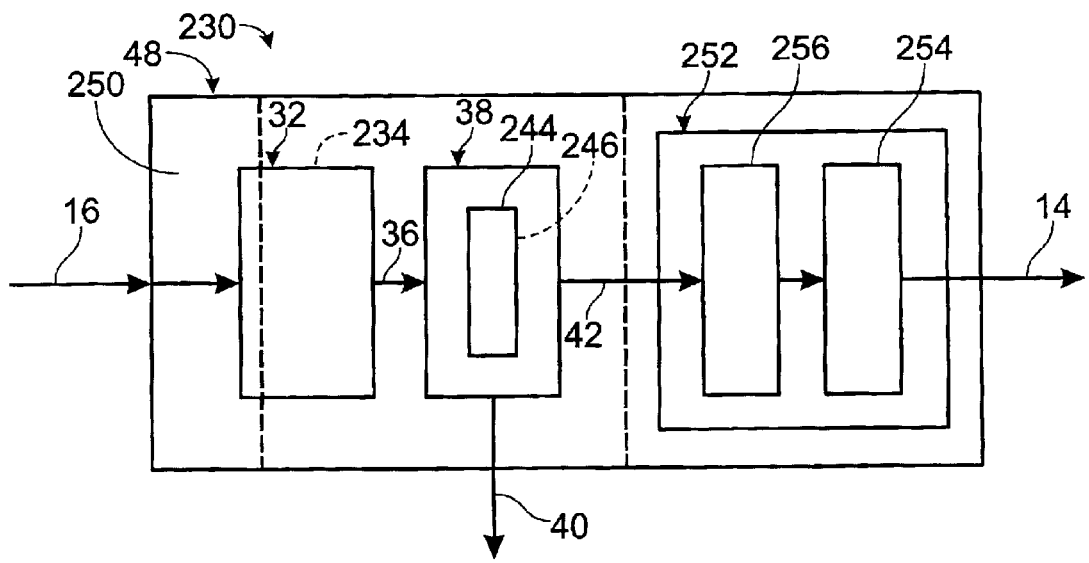
FIG. 16 is a schematic diagram of another suitable reformer for use with feedstock delivery systems according to the present invention.

Reformer 230 may, but does not necessarily, further include a polishing region 252, such as shown in FIG. 16. Polishing region 252 receives hydrogen-rich stream 42 from separation region 38 and further purifies the stream by reducing the concentration of, or removing, selected compositions therein. For example, when stream 42 is intended for use in a fuel cell stack, such as stack 22, compositions that may damage the fuel cell stack, such as carbon monoxide and carbon dioxide, may be removed from the hydrogen-rich stream. Region 252 includes any suitable structure for removing or reducing the concentration of the selected compositions in stream 42. For example, when the product stream is intended for use in a PEM fuel cell stack or other device that will be damaged if the stream contains more than determined concentrations of carbon monoxide or carbon dioxide, it may be desirable to include at least one methanation catalyst bed 254. Bed 254 converts carbon monoxide and carbon dioxide into methane and water, both of which will not damage a PEM fuel cell stack. Polishing region 252 may also include another hydrogen-producing device 256, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

In FIGS. 15 and 16, reformer 230 is shown including a shell 48 in which the above-described components are contained. Shell 48, which also may be referred to as a housing, enables the fuel processor, such as reformer 230, to be moved as a unit. It also protects the components of the fuel processor from damage by providing an exterior cover and reduces the heating demand of the fuel processor because the components of the fuel processor may be heated as a unit, and heat generated by one component may be used to heat other components. Shell 48 may, but does not necessarily, include an interior layer of an insulating material 250, such as a solid insulating material or an air-filled cavity. It is within the scope of the invention, however, that the reformer may be formed without a housing or exterior shell, or alternatively, that one or more of the components may either extend beyond the shell or be located external the shell. For example, and as schematically illustrated in FIG. 15, polishing region 252 may be external shell 48 and/or a portion of reforming region 32 may extend beyond the shell. Other examples of fuel processors demonstrating these configurations are illustrated in the incorporated references.

Fuel cell systems 10 according to the present invention may be combined with an energy-consuming device, such as device 25, to provide the device with an integrated, or on-board, energy source. Examples of such devices include a motor vehicle, such as a recreational vehicle, automobile, boat or other seacraft, and the like, a dwelling, such as a house, apartment, duplex, apartment complex, office, store or the like, or self-contained equipment, such as a microwave relay station, transmitting assembly, remote signaling or communication equipment, etc.

Finally, it is within the scope of the invention that the above-described fuel processor and feedstock delivery system may be used independent of a fuel cell stack. In such an embodiment, the system may be referred to as a fuel processing system and may be used to provide a supply of pure or substantially pure hydrogen. This supply may be stored, delivered to an integrated or separate hydrogen-consuming device, or otherwise used.

Industrial Applicability

The present invention is applicable in any fuel processing system or fuel cell system in which hydrogen gas is produced from a feed stream that includes at least two components.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the disclosure or subsequently filed claims recite "a" or "a first" element or the equivalent thereof, it should be within the scope of the present inventions that such disclosure or claims may be understood to include incorporation of one or more such elements, neither requiring nor excluding two or more such elements.

Applicants reserve the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A fuel processing system, comprising:
a fuel processor having a reforming region;
a feedstock delivery system adapted to deliver a feed stream containing a predetermined mix ratio of feedstock components to the fuel processor, the feedstock delivery system comprising:
a water delivery assembly adapted to provide a stream comprising liquid water;
a carbon-containing feedstock delivery assembly adapted to provide a stream comprising a liquid carbon-containing feedstock;
a reservoir adapted to receive a volume of liquid water and a volume of liquid carbon-containing feedstock from the water and the carbon-containing feedstock delivery assemblies;
a sensor assembly associated with the reservoir and adapted to detect at least one triggering event related to the quantity of one or more of the feedstock components in the reservoir; and
wherein the feedstock delivery system is adapted to regulate the flow of the streams comprising the liquid water and the liquid carbon-containing feedstock at least partially in response to the detection of the at least one triggering event by the sensor-assembly to produce the feed stream containing a predetermined mix ratio of the liquid water and the liquid carbon-containing feedstock; and
wherein the fuel processor is adapted to produce a product stream containing hydrogen gas from the feed stream.

2. The fuel processing system of claim 1, wherein the sensor assembly is adapted to detect a first triggering event related to the quantity of a first one of the water or the carbon-containing feedstock delivered to the reservoir, and a second triggering event related to the quantity of either a second one of the water or the carbon-containing feedstock or the total amount of water and carbon-containing feedstock delivered to the reservoir.

3. The fuel processing system of claim 2, wherein each of the triggering events includes a measurable event in which a predetermined threshold value or range of values representative of a predetermined amount of one or more of the water, the carbon-containing feedstock, or the total liquid in the reservoir is reached or exceeded.

4. The fuel processing system of claim 1, wherein the sensor assembly is adapted to detect a first triggering event related to the quantity of a first one of the water or the carbon-containing feedstock present in the reservoir, and a second triggering event related to the quantity of either a second one of the water or the carbon-containing feedstock or the total amount of water and carbon-containing feedstock present in the reservoir.

5. The fuel processing system of claim 4, wherein each of the triggering events includes a measurable event in which a predetermined threshold value or range of values representative of a predetermined amount of one or more of the water, the carbon-containing feedstock, or the total liquid in the reservoir is reached or exceeded.

6. The fuel processing system of claim 1, wherein the feedstock delivery system is adapted to produce a feed stream containing a stoichiometric mix ratio of water to carbon-containing feedstock.

7. The fuel processing system of claim 1, wherein the feedstock delivery system is adapted to produce a feed stream containing greater than a stoichiometric mix ratio of water to carbon-containing feedstock.

8. The fuel processing system of claim 7, wherein the feedstock delivery system is adapted to produce a feed stream containing 10–50% more water than a stoichiometric mix ratio of water to carbon-containing feedstock.

9. The fuel processing system of claim 7, wherein the feedstock delivery system is adapted to produce a feed stream containing at least approximately 100% more water than a stoichiometric mix ratio of water to carbon-containing feedstock.

10. The fuel processing system of claim 1, wherein the sensor assembly includes at least one sensor external the reservoir.

11. The fuel processing system of claim 1, wherein the sensor assembly includes at least one sensor internal the reservoir.

12. The fuel processing system of claim 1, wherein the sensor assembly includes at least one sensor located partially within the reservoir and partially external the reservoir.

13. The fuel processing system of claim 1, wherein the sensor assembly includes at least one gravimetric sensor.

14. The fuel processing system of claim 1, wherein the sensor assembly includes at least one volumetric sensor.

15. The fuel processing system of claim 1, wherein the sensor assembly includes at least one physical property sensor adapted to measure at least one physical property of liquid in the reservoir.

16. The fuel processing system of claim 15, wherein the physical property sensor includes a refractive index sensor.

17. The fuel processing system of claim 15, wherein the physical property sensor includes a densitometer.

18. The fuel processing system of claim 15, wherein the physical property sensor includes a viscometer.

19. The fuel processing system of claim 15, wherein the physical property sensor includes a spectrophotometer.

20. The fuel processing system of claim 15, wherein the physical property sensor includes an electrical conductivity sensor.

21. The fuel processing system of claim 1, wherein the reservoir includes at least one partition adapted to segregate the reservoir into at least two regions, and further wherein the sensor assembly includes at least one sensor adapted to detect the volume of liquid in each region.

22. The fuel processing system of claim 21, wherein at least one of the regions includes a neck having a reduced cross-sectional area compared to the rest of the region.

23. The fuel processing system of claim 22, wherein the sensor assembly is adapted to detect the volume of liquid in the neck of the at least one region that includes a neck having a reduced cross-sectional area.

24. The fuel processing system of claim 22, wherein the reservoir includes at least two regions that each include a neck having a reduced cross-sectional area compared to the rest of the region.

25. The fuel processing system of claim 1, wherein the reservoir has a capacity and includes a vent assembly adapted to contain liquid exceeding the capacity of the reservoir and to deliver the liquid exceeding the capacity of the reservoir to a containment structure.

26. The fuel processing system of claim 1, wherein the reservoir includes a mixing device adapted to promote mixing of the carbon-containing feedstock and the water in the reservoir.

27. The fuel processing system of claim 1, wherein the system further includes a second reservoir adapted to receive the feed stream from the reservoir prior to delivery of the feed stream to the fuel processor.

28. The fuel processing system of claim 27, wherein the second reservoir includes a second sensor assembly associated with the second reservoir and adapted to detect at least one triggering event related to the quantity of the feed stream in the second reservoir.

29. The fuel processing system of claim 27, wherein the second reservoir includes a mixing device adapted to promote mixing of the carbon-containing feedstock and the water in the feed stream.

30. The fuel processing system of claim 1, wherein the carbon-containing feedstock is selected to be soluble in water.

31. The fuel processing system of claim 1, wherein the carbon-containing feedstock is selected to form an emulsion with water.

32. The fuel processing system of claim 31, wherein the carbon-containing feedstock further includes a surfactant.

33. The fuel processing system of claim 31, wherein the reservoir includes an emulsion-producing device adapted to produce an emulsion of the water and the carbon-containing feedstock.

34. The fuel processing system of claim 1, wherein the feedstock delivery system further includes a controller adapted to regulate the flow of the streams into the reservoir at least partially in response to the at least one triggering event detected by the sensor assembly.

35. The fuel processing system of claim 34, wherein the controller is a computerized controller.

36. The fuel processing system of claim 34, wherein the controller is adapted to monitor selected operating parameters of the fuel processing system and to regulate the operation of the feedstock delivery system at least partially in response thereto.

37. The fuel processing system of claim 36, wherein the operating parameters include elapsed time after at least one of the water or the carbon-containing feedstock begins to be delivered to the reservoir.

38. The fuel processing system of claim 34, wherein the feedstock delivery system includes a plurality of flow-regulating devices, and further wherein the controller is adapted to control the operation of the flow-regulating devices at least partially in response to the at least one triggering event detected by the sensor assembly.

39. The fuel processing system of claim 38, wherein each of the at least one triggering event includes a measurable event in which a predetermined threshold value or range of values representative of a predetermined amount of one or more of the water, the carbon-containing feedstock, or the total liquid in the reservoir is reached or exceeded.

40. The fuel processing system of claim 35, wherein the controller includes a memory portion adapted to store a plurality of predetermined threshold values corresponding to a predetermined mix ratio of water and carbon-containing feedstock.

41. The fuel processing system of claim 40, wherein the controller includes a memory portion adapted to store a second plurality of predetermined threshold values corresponding to a second predetermined mix ratio of water and carbon-containing feedstock.

42. The fuel processing system of claim 34, wherein the feedstock delivery system further includes a user interface in communication with the controller, and further wherein the controller is adapted to regulate the flow of the streams into the reservoir at least partially in response to user inputs to the user interface.

43. The fuel processing system of claim 42, wherein the user interface is adapted to receive user inputs selecting the predetermined mix ratio.

44. The fuel processing system of claim 43, wherein the controller is adapted to display to the user via the user interface a plurality of predetermined mix ratios and to receive a user input selecting one of the plurality of predetermined mix ratios.

45. The fuel processing system of claim 1, wherein the reforming region is adapted to produce a mixed gas stream containing hydrogen gas and other gases from the feed stream and the fuel processor further includes a separation region adapted to separate the mixed gas stream into a product stream containing at least substantially pure hydrogen gas and a byproduct stream containing at least a substantial portion of the other gases.

46. The fuel processing system of claim 45, wherein the separation region includes at least one hydrogen-selective metal membrane.

47. The fuel processing system of claim 46, wherein the separation region includes a plurality of generally planar hydrogen-selective metal membranes.

48. The fuel processing system of claim 46, wherein the separation region includes at least one tubular hydrogen-selective metal membrane.

49. The fuel processing system of claim 45, wherein the separation region is in fluid communication with a polishing catalyst bed including a methanation catalyst.

50. The fuel processing system of claim 1, further comprising a fuel cell stack adapted to receive at least a portion of the product stream and to produce an electric current therefrom.

51. The fuel processing system of claim 50, further comprising at least one energy-consuming device adapted to draw at least a portion of the electric current produced by the fuel cell stack.

52. A fuel processing system, comprising:
a fuel processor having a reforming region;
a feedstock delivery system adapted to deliver a feed stream containing a predetermined mix ratio of feed stock components to the fuel processor, the feedstock delivery system comprising:

a water delivery assembly adapted to provide a stream comprising liquid water;

a carbon-containing feedstock delivery assembly adapted to provide a stream comprising a liquid carbon-containing feedstock;

a reservoir adapted to receive a volume of liquid water and a volume of liquid carbon-containing feedstock from the water and the carbon-containing feedstock delivery assemblies;

means for producing the feed stream containing a predetermined mix ratio of the liquid water and the liquid carbon-containing feedstock, wherein the means for producing includes means for detecting the occurrence of at least one triggering event related to the quantity of one or more of the feedstock components in the reservoir; and wherein the fuel processor is adapted to produce a product stream containing hydrogen gas from the feed stream.

53. The fuel processing system of claim 52, wherein the means for producing are adapted to produce a feed stream containing a stoichiometric mix ratio of water to carbon-containing feedstock.

54. The fuel processing system of claim 52, wherein the means for producing are adapted to produce a feed stream containing a greater than a stoichiometric mix ratio of water to carbon-containing feedstock.

55. The fuel processing system of claim 54, wherein the means for producing are adapted to produce a feed stream containing at least 10% greater water than a stoichiometric mix ratio of water to carbon-containing feedstock.

56. The fuel processing system of claim 54, wherein the means for producing are adapted to produce a feed stream containing at least 50% greater water than a stoichiometric mix ratio of water to carbon-containing feedstock.

57. The fuel processing system of claim 52, wherein the means for detecting are adapted to detect a first triggering event related to the quantity of a first one of the water or the carbon-containing feedstock delivered to the reservoir, and a second triggering event related to the quantity of either a second one of the water or the carbon-containing feedstock or the total amount of water and carbon-containing feedstock delivered to the reservoir.

58. The fuel processing system of claim 52, further including means for controlling the operation of the fuel processing system at least partially in response to the detection of the at least one triggering event.

59. The fuel processing system of claim 52, wherein the carbon-containing feedstock is adapted to form an emulsion with the water, and the reservoir includes means for producing an emulsion from the water and the carbon-containing feedstock.

60. A batch method for producing a feed stream for a fuel processor, the method comprising:

delivering a first liquid feedstock component until a sensor assembly detects the occurrence of a first triggering event corresponding to a predetermined amount of the first feedstock component;

delivering a second liquid feedstock component until a sensor assembly detects the occurrence of a second triggering event corresponding to at least one of a predetermined amount of the second feedstock component or a predetermined property of a mixture of the first and the second feedstock components;

delivering a feed stream containing the first and the second liquid feedstock components as a feed stream to a fuel processor containing a reforming region;

producing a product hydrogen stream containing hydrogen gas from the feed stream; and, wherein the first liquid feedstock component comprises a first one of water or a carbon-containing feedstock, and further wherein the second liquid feedstock component comprises a second one of water or a carbon-containing feedstock.

61. The method of claim 60, wherein the method further includes the step of mixing the first and the second feedstock components prior to delivering the first and the second feedstock components as a feed stream to the fuel processor.

62. The method of claim 61, wherein the method further includes the step of forming an emulsion from the first and the second feedstock components prior to delivering the first and the second feedstock components as a feed stream to the fuel processor.

63. The method of claim 61, wherein prior to delivering the first and the second feedstock components as a feed stream to the fuel processor, the method further includes the step of delivering the first and second components to a reservoir.

64. The method of claim 63, wherein prior to delivering the first and the second feedstock components as a feed stream to the fuel processor, the method further includes the step of delivering the first and second components to a second reservoir.

65. A method for producing hydrogen gas, comprising:

delivering a first liquid feedstock component to a mixing chamber including a sensor assembly adapted to detect at least a first and second predetermined triggering event, until the sensor assembly detects the first triggering event;

delivering a second liquid feedstock component to the mixing chamber until the sensor assembly detects the second triggering event;

withdrawing from the mixing chamber a liquid stream containing a predetermined mix ratio of the first and the second liquid feedstock components;

delivering at least a portion of the liquid stream to a fuel processor having a reforming region and adapted to produce a product stream containing hydrogen gas therefrom and, wherein the first liquid feedstock component comprises a first one of water or a carbon-containing feedstock, and further wherein the second liquid feedstock component comprises a second one of water or a carbon-containing feedstock.

66. The fuel processing system of claim 1, wherein the fuel processing system includes means for vaporizing the feed stream produced in the feedstock delivery system.

67. The fuel processing system of claim 2, wherein the first triggering event is related to a volumetric quantity of the first one of the water or the carbon-containing feedstock delivered to the reservoir.

68. The fuel processing system of claim 2, wherein the first triggering event is related to a gravimetric quantity of the first one of the water or the carbon-containing feedstock delivered to the reservoir.

69. The fuel processing system of claim 2, wherein the second triggering event is related to a volumetric quantity of either the second one of the water or the carbon-containing feedstock delivered to the reservoir or the total amount of water and carbon-containing feedstock delivered to the reservoir.

70. The fuel processing system of claim 2, wherein the second triggering event is related to a gravimetric quantity of either the second one of the water or the carbon-containing feedstock delivered to the reservoir or the total amount of water and carbon-containing feedstock delivered to the reservoir.

71. The fuel processing system of claim 4, wherein the first triggering event is related to a volumetric quantity of the first one of the water or the carbon-containing feedstock present in the reservoir.

72. The fuel processing system of claim 4, wherein the first triggering event is related to a gravimetric quantity of the first one of the water or the carbon-containing feedstock present in the reservoir.

73. The fuel processing system of claim 4, wherein the second triggering event is related to a volumetric quantity of either the second one of the water or the carbon-containing feedstock present in the reservoir or the total amount of water and carbon-containing feedstock present in the reservoir.

74. The fuel processing system of claim 4, wherein the second triggering event is related to a gravimetric quantity of either the second one of the water or the carbon-containing feedstock present in the reservoir or the total amount of water and carbon-containing feedstock present in the reservoir.

75. The fuel processing system of claim 45, wherein the separation region is adapted to separate the mixed gas stream into the product stream and the byproduct streams via a pressure swing adsorption process.

76. The fuel processing system of claim 52, wherein the fuel processing system further includes means for vaporizing the feed stream produced in the feedstock delivery system.

77. The fuel processing system of claim 52, wherein the means for producing includes gravimetric means for producing.

78. The fuel processing system of claim 52, wherein the means for producing includes volumetric means for producing.

79. The method of claim 60, wherein the predetermined amounts correspond to predetermined volumetric amounts of the first and the second feedstock components.

80. The method of claim 60, wherein the predetermined amounts correspond to predetermined gravimetric amounts of the first and the second feedstock components.

81. The method of claim 65, wherein the first triggering event is related to a volumetric quantity of the first feedstock component delivered to or present in the reservoir.

82. The method of claim 65, wherein the first triggering event is related to a gravimetric quantity of the first feedstock component delivered to or present in the reservoir.

83. The method of claim 65, wherein the second triggering event is related to a volumetric quantity of the second feedstock component delivered to the reservoir.

84. The method of claim 65, wherein the second triggering event is related to a gravimetric quantity of the second feedstock component delivered to the reservoir.

85. The method of claim 65, wherein the method further includes vaporizing the liquid stream withdrawn from the mixing chamber.

\* \* \* \* \*

UNITED STATES PATENT AND TRADEMARK OFFICE
CERTIFICATE OF CORRECTION

PATENT NO. : 6,890,672 B2
DATED : May 10, 2005
INVENTOR(S) : Anthony J. Dickman, David J. Edlund and William A. Pledger It is certified that error appears in the above-identified patent and that said Letters Patent is hereby corrected as shown below:

Column 27,
Line 7, after "containing" please delete "fcedstock;" and insert -- feedstock; -- therefor.

Column 29,
Line 27, after "and the byproduct" please delete "streams" and insert -- stream -- therefor.

Column 30,
Lines 15 and 18, after "or present in the" please delete "reservoir" and insert -- mixing chamber -- therefor.
Lines 21 and 24, after "component delivered to the" please delete "reservoir" and insert -- mixing chamber -- therefor.

Signed and Sealed this

Nineteenth Day of July, 2005

JON W. DUDAS
*Director of the United States Patent and Trademark Office*